US009384357B2

(12) United States Patent
Patil et al.

(10) Patent No.: US 9,384,357 B2
(45) Date of Patent: Jul. 5, 2016

(54) PROVIDING APPLICATION PRIVACY INFORMATION

(71) Applicant: Quixey, Inc., Mountain View, CA (US)

(72) Inventors: Sameer Patil, Santa Ana, CA (US); Eric Glover, Palo Alto, CA (US); Taher Savliwala, Mountain View, CA (US); Gilead Mark, Palo Alto, CA (US)

(73) Assignee: Quixey, Inc., Mountain View, CA (US)

( * ) Notice: Subject to any disclaimer, the term of this patent is extended or adjusted under 35 U.S.C. 154(b) by 0 days.

(21) Appl. No.: 14/504,077

(22) Filed: Oct. 1, 2014

(65) Prior Publication Data

US 2016/0098566 A1    Apr. 7, 2016

(51) Int. Cl.
*G06F 21/60* (2013.01)

(52) U.S. Cl.
CPC ..................... *G06F 21/60* (2013.01)

(58) Field of Classification Search
None
See application file for complete search history.

(56) References Cited

U.S. PATENT DOCUMENTS

| | | | | |
|---|---|---|---|---|
| 2004/0128302 A1* | 7/2004 | Schirmer | ............ | G06F 21/6254 |
| 2010/0201489 A1* | 8/2010 | Griffin | ................ | G06F 21/6245 340/10.1 |
| 2012/0054821 A1* | 3/2012 | Roy | .................... | G06F 21/6245 726/1 |
| 2013/0263287 A1* | 10/2013 | Ayyalasomayajula | | H04W 8/245 726/30 |
| 2013/0291123 A1* | 10/2013 | Rajkumar | ............... | G06F 21/00 726/28 |
| 2013/0340086 A1* | 12/2013 | Blom | .................. | G06F 21/6245 726/26 |
| 2014/0007222 A1* | 1/2014 | Qureshi | ................... | G06F 21/10 726/16 |
| 2014/0095692 A1* | 4/2014 | Anderson | ............... | H04L 67/22 709/224 |
| 2014/0096237 A1* | 4/2014 | Takayanagi | ......... | G06F 21/6218 726/17 |
| 2014/0280240 A1 | 9/2014 | Glover et al. | | |
| 2014/0282493 A1 | 9/2014 | Glover et al. | | |
| 2014/0344015 A1* | 11/2014 | Puertolas-Montanes | | G06Q 20/10 705/7.29 |
| 2014/0373168 A1* | 12/2014 | Chen | ....................... | G06F 21/60 726/26 |
| 2014/0378099 A1* | 12/2014 | Huang | ..................... | H04M 1/67 455/411 |

* cited by examiner

*Primary Examiner* — Hadi Armouche
*Assistant Examiner* — Malcolm Cribbs
(74) *Attorney, Agent, or Firm* — Harness, Dickey & Pierce, P.L.C.

(57) ABSTRACT

A system includes a data processing device, a memory, identifications of applications, and a privacy indication module. Each identification of the application has associated therewith a privacy indicator that indicating a degree of expected privacy of each of the corresponding applications. The privacy indication module is configured to control the data processing device to set each of the privacy indicators of each of the identifications of the applications and to provide at least one of the privacy indicators to control publication of information corresponding to at least one of the applications.

12 Claims, 13 Drawing Sheets

PROVIDING APPLICATION PRIVACY INFORMATION

TECHNICAL FIELD

The present disclosure generally relates to data and, more particularly, to techniques for providing a privacy indicator associated with an application.

BACKGROUND

Friends, family, and colleagues are important sources for application discovery. Application installations and/or uses of applications are being increasingly shared among social and professional circles. The sharing of this information often serves application discovery, revealing which applications are popular in general or among different friends and social circles. Sharing application installation and usage information, however, generally raises privacy concerns. Even if a user does not generally mind sharing information regarding what applications the user has installed, there may be specific applications that are installed and/or used that the user may not wish others to know about (e.g., applications related to dating, pregnancy, medical issues, or the like).

Information regarding application usage is also increasingly being shared for the purposes of analytics and advertisement selection. Like sharing information with others, the sharing of application usage information also raises privacy concerns. Users may not wish that others (including third-party data collection analytics engines and advertisers) be aware of certain preferences or personal information (e.g., medical conditions).

SUMMARY

In various implementations, a system includes a data processing device, a memory, identifications of applications, and a privacy indication module. Each identification of the application may have associated therewith a privacy indicator that indicates a degree of expected privacy of the corresponding application. The privacy indication module may be configured to control the data processing device to set each of the privacy indicators of each of the identifications of the applications and to provide at least one of the privacy indicators to control publication of information corresponding to at least one of the applications.

Implementations of the disclosure may include one or more of the following features. In some implementations, the privacy indication module includes a presentation module that shares or allows publication by the data processing device of download information (by a user or user device) associated with at least one of the applications based on at least one privacy indicator. The download information indicates a download of the corresponding application. In some examples, the system includes a display in communication with the data processing device. The privacy indication module may include a presentation module that displays information on the display related to the application based on the privacy indicator. Additionally or alternatively, the privacy indication module may include a presentation module that displays history information indicating a previous download of at least one of the applications.

Each of the privacy indicators may indicate whether the information related to the corresponding application is intended to be private. In some examples, each of the privacy indicators may be a value corresponding to a degree that information related to the corresponding application is intended to be private.

In some implementations, the data processing device executes a privacy indicator determination module configured to determine at least one of the privacy indicators based on input from a plurality of users. Moreover, the data processing device may execute a privacy indicator determination module that determines at least one of the privacy indicators based on input from a user.

In various implementations, the data processing device executes a sensitivity assessment module that receives a function category associated with at least one function of at least one application of the plurality of applications. The function category is further associated with a category privacy indicator. The sensitivity assessment module may determine at least one of the privacy indicators (e.g., an indication of private) based on the category privacy indicator.

Another aspect of the disclosure provides a method that includes determining, using a data processing device, a plurality of privacy indicators. Each privacy indicator has associated therewith an application. Moreover, each privacy indicator indicates a degree of expected privacy of each of the applications. The method also includes storing the plurality of privacy indicators in non-transitory memory in communication with the data processing device, and controlling publication, by the data processing device, of information corresponding to at least one of the applications based on at least one privacy indicator.

Another aspect of the disclosure provides a computer program product encoded on a non-transitory computer readable storage medium having instructions that when executed by a data processing device cause the data processing device to perform a method. The method includes determining a plurality of privacy indicators, where each privacy indicator has associated therewith an application and indicates a degree of expected privacy of each of the applications. The method also includes storing the plurality of privacy indicators in non-transitory memory in communication with the data processing device, and controlling publication, by the data processing device, of information corresponding to at least one of the applications based on at least one privacy indicator.

One aspect of the disclosure provides a system including non-transitory memory and a data processing device in communication with the non-transitory memory. The non-transitory memory stores identifications of applications, each application having associated therewith a privacy indicator indicating a degree of expected privacy of the corresponding application. The data processing device executes instructions that cause the data processing device to implement a privacy indication module that sets the degree of expected privacy of each privacy indicator stored in the non-transitory memory. The data processing device also controls publication of information corresponding to at least one of the applications based on at least one privacy indicator associated with the at least one application.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
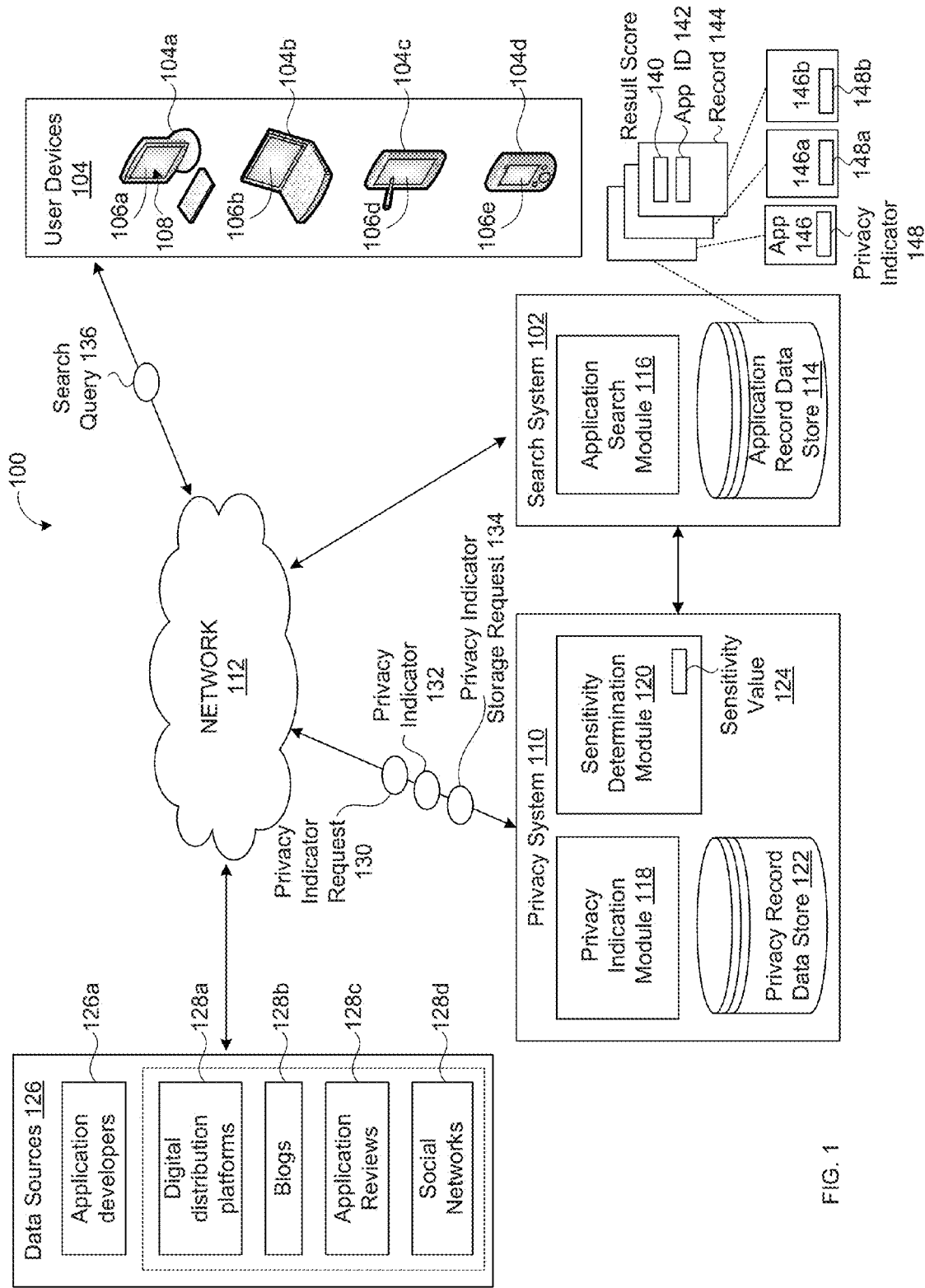
FIG. 1 is a pictogram illustrating an environment including a search system and a privacy system in some embodiments.

Certain software applications may be considered "sensitive" even by those users who typically share information regarding application selection and installation with their social and professional circles. Privacy concerns regarding sharing practices and preferences related to such applications can make people reluctant to share information about any applications, if the sharing mechanisms do not effectively allow withholding sharing information about the privacy-sensitive applications. A privacy-sensitive application is any software application that a user may consider to be private (e.g., a personal application or an application that potentially contains personal information) and, as a result, the user may be reluctant or refuse to share information about or associated with the application. In order to design mechanisms that can provide capabilities to withhold sharing of information related to privacy-sensitive applications, the mechanism may be designed to identify whether an application is likely to be privacy-sensitive and, in some instances, to what extent.

Privacy indicators associated with one or more different applications may be utilized to protect the privacy of a user in any number of ways. For example, entities that provide services to collect installation, usage, or application search data may utilize privacy indicators to limit collection of data to respect privacy concerns. In another example, an advertising network may review any privacy indicators associated with applications before collecting and/or utilizing application information (e.g., data of application usage or data from the application) for targeted advertising.

In another example, some entities (e.g., social networks) may wish to automatically share application installation and/or application usage information by a user with that user's friends and family. Before sharing information, the entity may identify any privacy indicators associated with the user's applications and limit (or stop) information sharing in order to respect the user's privacy.

The privacy indicators may also be utilized to protect the privacy of different users on a single device. Many operating systems support multiple user accounts and provide access to different information and/or applications depending on the user. An operating system may support multiple user accounts and provide access to different information and/or applications depending on the user that is currently logged in based on the privacy indicator. For example, the operating system may determine to display an application on a home screen (and/or information about application usage) based on the current user logged into the digital device 104 and the privacy indicator of that application. In some embodiments, the operating system may determine permissions for any number of users of the digital device 104 to view, access, or make changes to a particular application based on that particular application's privacy indicator.

Operating systems or applications may also check a privacy indicator before showing or sending application notifications. Many applications provide notifications, alarms, or the like to users of device (e.g., users of smartphones). An operating system and/or an application may check a privacy indicator to determine whether an application should be enabled to notify, alert, or otherwise provide messages. For example, an operating system may check for a privacy indicator associated with an application that contains health information before allowing the application to provide a notification of an upcoming health treatment.

It will be appreciated that privacy indicators may be determined and provided to any number of entities or users for any number of uses. In some embodiments, privacy indicator determinations can be made by aggregating sharing decisions across a population of users and/or examining individual sharing decisions by a user. To be clear, the decisions to share (or not share) installation of an application (e.g., a decision to share or not share the name of an application that has been installed) can be aggregated across a user population to determine the extent to which an application might be sensitive. For instance, if 80% of the users share application A while only 20% share application B, then application B is likely to be considered more private than application A.

In another example of determining whether an application is privacy-sensitive by examining user behavior, if a user chooses to share only some of the information regarding applications the user installs, then the applications that are not shared can be marked as potentially sensitive. An example of choosing to share only some of the information regarding the application includes choosing to share an identifier of the application with others and/or choosing to share personal information from within the application. The determination of privacy-sensitivity based on aggregated sharing decisions can be further refined by examining differences based on user characteristics, such as demographics (e.g., race, age, gender, or the like). For example, certain applications may be considered privacy-sensitive mainly by females but not by males. In another example, other applications may be considered privacy-sensitive by teenagers but not by adults (e.g., dating applications).

Figure 2:
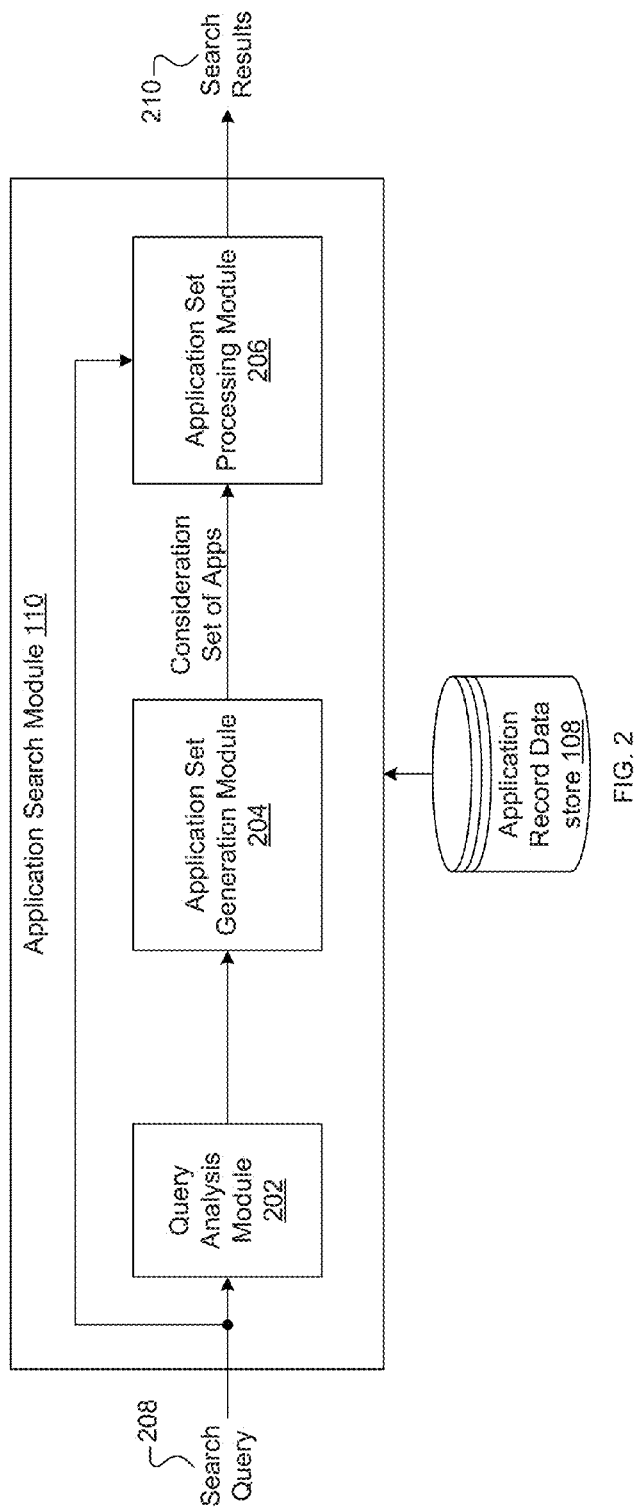
FIG. 2 shows an application search module that may be included in the search system in some embodiments.
Figure 3B:
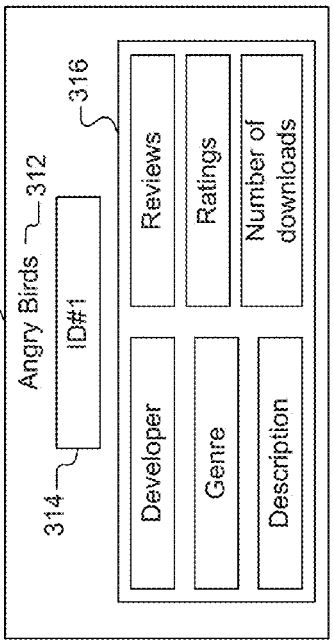
FIGS. 3A-3B show pictograms illustrating application records in some embodiments.
Figure 3A:
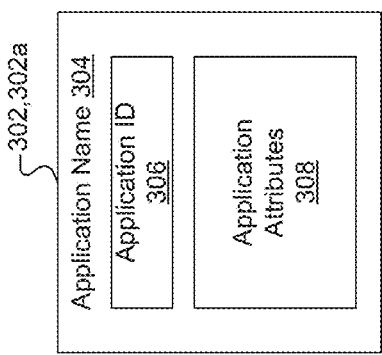

FIG. 1 is a pictogram illustrating an environment 100 including a search system 102, user devices 104 (also referred to herein as computing devices), a privacy system 110, and data sources 126, each in communication with a network 112. With reference to FIGS. 2, 3A, and 3B, in some implementations, the search system 102 receives search queries 136 from one or more user devices 104, via the network 112, and performs a search for applications 146 in response to a received search query 208. Exemplary user devices 104 include, but are not limited to, a computer 104a, a laptop 104b, a tablet computer 104c, a smartphone 104d, a portable electronic device, etc. Exemplary data sources 126 may include, but are not limited to application developers 126a, digital distribution platforms 128a, blogs 128b, application reviews 128c, and social networks 128d. Other data sources are possible as well. The search system 102 may generate a search result set 210 (see FIG. 2), such as a list of records 144 identifying applications 146 (e.g., by corresponding application identifiers 142—see FIG. 3A). Each record 144 for application 146 may have an associated result score 140 that indicates a rank of the identified application 146 relative to the other applications 146 identified in the search result set 210. The search system 102 may transmit the search result set 210 to the user device 104 that transmitted the search query 208. In some implementations, each application 146 is associated with a privacy indicator 148. At its most general, the privacy indicator 148 indicates whether information about an associated application 146 is intended to be private. The privacy indicator 148 may indicate levels or degrees regarding information about an associated application 146 that is intended to be private. A global privacy indicator is an indicator based on input from a population of users. For example, privacy indicators 148 of an associated application 146 from any number of a population of users may be aggregated to determine a global privacy indicator. The global privacy indicator may be displayed to users as a default indication of a degree of privacy of one or more applications 146. A user may override a global privacy indicator of an associated application 146 by providing a user privacy indicator 148. The user privacy indicator 148 of an associated application 146 indicates the user's intent of privacy regarding information associated with the application 146.

In some implementations, the privacy indicator 148 (i.e., either the global privacy indicator or user privacy indicator 148) may be utilized to influence actions. For example, if a user downloads an application 146 that is associated with a privacy indicator 148 indicating a private or sensitive application, the application 146 may be downloaded to a special (e.g., nonvisible and/or secured) folder. Based on the privacy indicator 148, a downloading server may choose to not index and/or track usage of the application. Moreover, a social network 128d and other third parties may be excluded from receiving information about usage of particular applications in response to the corresponding privacy indicator 148. Any amount of information regarding the installation of the application may be shared or not shared based on the privacy indicator 148.

The privacy indicator 148 may simply indicate whether information associated with an application 146 is intended to be private or public (e.g., the privacy indicator may be a simple flag indicating a request for privacy). In some examples, the privacy indicator 148 is a value within a range that may allow for a variety of options for control of public and/or private actions. For example, a user may have different levels of privacy expectations. One privacy indicator value at or above a given threshold may indicate that the user (or users) desires information associated with the corresponding application to remain private. Another privacy indicator value in a given range may indicate that the user (or users) approves of sharing information regarding installation or use of an application with a limited number of others (e.g., a limited circle of friends or family) but not to the public. A user may also want to share indexing and/or usage information of the application as long as the information is aggregated and not specifically identified. A highly private user may create a rule that indicates that if the privacy indicator is a value above zero (0), then information associated with the corresponding application is not intended to be shared.

In another example, a user may assign a privacy indicator to indicate that the user wishes to share only some information about an application. For instance, the user may assign a numerical value as a privacy indicator. In some embodiments, the numerical value may be compared to various thresholds. For example, a high numerical value above the highest threshold may, for example, indicate the user's approval to share all information associate with an application. A numerical value between two thresholds may indicate the user's approval to share application information only with family or only with users of a digital device (e.g., a smartphone). Another numerical value between two other thresholds may indicate the user's approval to share limited application information such as installation information but not usage information. A low numerical value below the lowest threshold may, for example, indicate the user's disapproval to share any information associated with the application. A user may specify a degree of expected privacy based on any privacy indicator.

Identifying applications 146 that are potentially privacy-sensitive can help enhance mechanisms for sharing application installations among social and professional circles in a way that reduces, minimizes, or ideally eliminates, privacy concerns and violations. In addition, a user may feel more comfortable sharing indexing and usage data of an application back to the search system. Reduction or removal of privacy concerns can facilitate greater amounts of sharing in general, which in turn enhances the utility and effectiveness of application recommendations derived from application usage among social and professional circles of an individual.

An application 146 may refer to a package of computer software developed to be executed on a computing device platform that causes a computing device to provide one or more functions. In some examples, a software application may be referred to as an "application," an "app," or a "program." Example applications 146 include, but are not limited to, word processing applications, spreadsheet applications, messaging applications, media streaming applications, social networking applications, and gaming applications.

Applications 146 can be executed on a variety of different computing devices 104. For example, applications 146 can be executed on mobile computing devices such as smart phones 104d, tablets 104c, and wearable computing devices (e.g., headsets and/or watches). Applications 146 can also be executed on other types of computing devices having other form factors such as laptop computers 104b, desktop computers 104a, or other consumer electronic devices. In some examples, applications 146 may be installed on a computing device prior to a user purchasing the computing device. In other examples, the user may download and install applications 146 on the computing device 104.

The functionality of an application 146 may be accessed on the computing device 104 on which the application 146 is installed. Additionally, or alternatively, the functionality of an application 146 may be accessed via a remote computing device 104. In some examples, an application's functionality is provided on the computing device 104 on which the application 146 is installed. These applications 146 may function without communication with other computing devices 104 (e.g., via the Internet). In other examples, an application 146 installed on a computing device 104 may access information from other remote computing devices 104 during operation. For example, a weather application installed on a computing device 104 may access the latest weather information via the Internet and display the accessed weather information to the user through the installed weather application. In still other examples, an application 146 (e.g., a web-based application) may be partially executed by the user's computing device 104 and partially executed by a remote computing device 104. For example, a web application may be an application 146 that is executed, at least in part, by a web server and accessed by a web browser of the user's computing device 104. Example web applications may include, but are not limited to, web-based email, online auctions, and online retail sites.

The privacy system 110 may comprise a privacy indication module 118, a sensitivity determination module 120, and a privacy record data store 122. The privacy system 110 may determine, store, and provide privacy indicators 148 for any number of applications 146. The privacy indication module 118 may retrieve and provide any number of privacy indicators 148. Privacy indicators 148 may be stored in the privacy record data store 122. Each privacy indicator 148 may be associated with a different application 146. The privacy indication module 118, for example, may associate privacy indicators 148 with search results 210 (see FIG. 2).

The sensitivity determination module 120 may receive and/or generate sensitivity values 124. A sensitivity value 124 may be any numeric value indicating a degree (e.g., an intensity) of sensitivity related to sharing or publishing information about and/or associated with an application 146 to one or more parties. In various embodiments, one or more users may be requested to provide privacy indicators 148 for any number of applications 146 (e.g., indicating a degree of privacy associated with information regarding the application 146). In one example, a privacy indicator 148 may be represented as a general flag or level of privacy intent and a sensitivity value 124 may be a number indicating a degree of sensitivity. The privacy system 110 may utilize only privacy indicators 148 or both privacy indicators 148 and sensitivity values 124.

The sensitivity determination module 120 may generate an aggregate sensitivity value for an application 146 by aggregating privacy indicators 148 and/or sensitivity values 124 for an application 146 from a population of users. The sensitivity determination module 120 may compare the aggregate sensitivity value to a global threshold to determine a privacy indicator 148 associated with the application 146. In various implementations, the sensitivity determination module 120 may utilize similarity between applications 146 as guidance in determining privacy indicators 148 and/or sensitivity values 124. In addition, leveraging similarity of data of applications 146 may be used to infer privacy indicators 148 for new applications. Similarity may be defined and quantified by how similar one application may be to another application, even across different platforms. Systems and methods for determining similarity between applications are described in detail in commonly-assigned U.S. patent application Ser. No. 13/839,068, filed on Mar. 15, 2013, and U.S. patent application Ser. No. 14/037,155, filed on Sep. 25, 2013, both of which are hereby incorporated by reference in their entirety.

The privacy system 110 may provide privacy indicators 148 to the user devices 104, the search system 102, and/or the data sources 126 via the network 112. The privacy system 110 is further discussed with regard to FIG. 5. As utilized herein, a system may comprise a single digital device (e.g., a server) or any number of digital devices.

One or more user devices 104 may display the search results to the user and allow the user to select one of the applications 146 identified in the list in order to view information related to the application 146 and/or download the application 146. The application identifiers 142 (e.g., the executable programs identified) listed in the search results 210 (see FIG. 2) sent to the user may be accessible from (e.g., downloaded from) systems different than the search system 102 in some examples. Put another way, the search system 102 may store data related to applications 146 that are accessible in locations other than the search system 102. For example, the identified applications 146 may be installed on user device 104. In another example, the identified applications 146 may be downloadable from digital distribution platforms 128a configured to distribute the applications 146. Example digital distribution platforms 128a include, but are not limited to, GOOGLE PLAY® developed by GOOGLE INC., the APP STORE® developed by APPLE INC., and WINDOWS PHONE STORE® developed by MICROSOFT CORPORATION. Although the application identifiers 142 listed in the search results 210 may be accessed in locations other than the search system 102, the search system 102 may include application identifiers 142 for download in some implementations.

The search system 102 includes an application record data store 114 and an application search module 116. The application record data store 114 includes a variety of different types of data related to different applications 146. The application record data store 114 may include one or more databases, indices (e.g., inverted indices), files, or other data structures that may be used to implement the techniques of the present disclosure. As described herein, the data included in the application record data store 114 may include descriptions of applications 146, statistics related to applications (e.g., download numbers, review numbers, etc.), and other information. The application search module 116 may receive a search query 208 (see FIG. 2) and generate search results 210 (see FIG. 2) based on the data included in the application record data store 114.

The search system 102 may communicate with the user devices 104 and data sources 126 via the network 112. Examples of the user devices 104, the data sources 126, and the network 112 are now described in turn.

User devices 104 can be any computing devices (e.g., digital devices) that are capable of providing search queries to the search system 102. A digital device is any device with a processor and memory. A digital device is further discussed regarding FIG. 10 herein. User devices 104 include, but are not limited to, smart phones 104d, tablet computers 104c, wearable computing devices (e.g., head-mounted displays and wrist watches), laptop computers 104b, and desktop computers 104a. User devices 104 may also include other computing devices having other form factors, such as computing devices included in vehicles, gaming devices, televisions, or other appliances (e.g., networked home automation devices and home appliances).

The user devices 104 may use a variety of different operating systems. In examples where a user device 104 is a mobile device, the user device 104 may run an operating system including, but not limited to, ANDROID® by GOOGLE INC., TIZEN® by TIZEN FOUNDATION, IOS® developed by APPLE INC., or WINDOWS PHONE® developed by MICROSOFT CORPORATION. In an example where a user device 104 is a laptop 104b or desktop computing device 104a, the user device 104 may run an operating system including, but not limited to, MICROSOFT WINDOWS, MAC OS, or LINUX. User devices 104 may also access the search system 102 while running operating systems other than those operating systems described above, whether presently available or developed in the future.

User devices 104 can communicate with the search system 102 via the network 112. In some examples, a user device 104 may communicate with the search system 102 using an application installed on the user device 104. In general, a user device 104 may communicate with the search system 102 using any application that can transmit search queries 208 (see FIG. 2) to the search system 102. In some examples, a user device 104 may run an application that is dedicated to interfacing with the search system 102, such as an application dedicated to application searches. In some examples, a user device 104 may communicate with the search system 102 using a more general application, such as a web-browser application. The application run by a user device 104 to communicate with the search system 102 may display a search field on a graphical user interface (GUI) 106 in which the user may enter search queries 208. The user may enter a search query using a touchscreen or physical keyboard, a speech-to-text program, or other form of user input.

A search query 208 entered into a GUI 106 displayed on a screen 108 of a user device 104 may include words, numbers, and/or symbols. In general, a search query may be a request for information retrieval (e.g., search results) from the search system 102. For example, a search query 208 may be directed to retrieving a list of application identifiers 142 in examples where the search system 102 is configured to generate a list of application identifiers 142 as search results 210. A search query 208 directed to retrieving a list of application identifiers may indicate a user's desire to retrieve applications 146 that have a functionality described by the search query 208.

A user device 104 may receive a set of search results 210 from the search system 102 that are responsive to the search query 208 transmitted to the search system 102. The user device 104 may be running an application including a GUI that displays the search results 210 received from the search system 102. For example, a search system interface may be utilized on the GUI 106a to transmit the search query 208 to the search system 102 may also display the received search results 210 to the user. As described above, the application 146 that displays the received search results 210 to the user may be dedicated to interfacing with the search system 102 in some examples. In other examples, the search system interface may be displayed in a general application, such as a web-browser application.

The GUI 106 running on the user device 104 may display the search results 210 to the user in a variety of different ways, depending on what information is transmitted to the user device 104. In examples where the search results include a list of ranked application identifiers 142, the search system 102 may transmit the list of application identifiers 142 to the user device 104. In this example, the GUI 106 may display the search results 210 to the user as a list of application names. In some examples, the search system 102, or other computing system, may transmit additional information to the user device 104 including, but not limited to, application ratings, application download numbers, application screenshots, and application descriptions. This additional information may be stored in the application record data store 114 and transmitted by the search system 102 to the user device 104 in some examples. In examples where the user device 104 receives this additional information, the GUI 106 may display this information along with the list of application names. In some examples, the GUI 106 may display the search results as a list of application names ordered from the top of the screen to the bottom of the screen based on relevance determined by a result score or sorted based on any criterion. In some examples, the search results 210 may be displayed under the search field in which the user entered the search query 208.

In some examples, user devices 104 may communicate with the search system 102 via a partner computing system (not illustrated). The partner computing system may be a computing system of a third party that may leverage the search functionality of the search system 102. The partner computing system may belong to a company or organization other than that which operates the search system 102. Example third parties which may leverage the functionality of the search system 102 may include, but are not limited to, Internet search providers and wireless communications service providers. The user devices 104 may send search queries to the search system 102 and receive search results via the partner computing system. The partner computing system may provide a user interface to the user devices 104 in some examples and/or modify the search experience provided on the user devices 104.

The data sources 126 may be sources of data that the search system 102 may use to generate and update the application record data store 114. For example, the search system 102 may use the data to update one or more databases, indices, files, or other data structures included in the application record data store 114. The search system 102 may generate new application records (e.g., application record 302 of FIG. 3A) and update existing application records based on data retrieved from the data sources 126. Although not illustrated in FIG. 1, the search system 102 may include modules that generate new application records 144 and update existing application records 144 based on the data retrieved from data sources 126 (e.g., digital distribution platforms 128a, blogs 128b, application reviews 128c, and/or social networks 128d). In some examples, some data included in the application record data store 114 may be manually generated.

The data sources 126 may include a variety of different data providers. The data sources 126 may include data from application developers 126a, such as application developers' websites. The data sources 126 may include operators of digital distribution platforms 126b configured to distribute applications to user devices 104. The data sources 126 may also include other websites 126c, such as websites that include web logs (i.e., blogs), application review websites 126d, or other websites including data related to applications. Additionally, the data sources 126 may include social networking sites 126e, such as FACEBOOK® (e.g., FACEBOOK posts) and TWITTER® (e.g., text from tweets). Data sources 126 may also include additional types of data sources in addition to the data sources described above. Different data sources may have their own content and update rate.

The search system 102 retrieves data from one or more of the data sources 126. The data retrieved from the data sources 126 can include any type of data related to applications 146. Examples of data related to applications 146 include, but are not limited to, a name of an application, a description of an application, a substantive review of an application, a quality rating of an application, a developer name, an excerpt from a blog post about an application, a tweet about an application, a video about an application (e.g., screencasts or tutorials), and one or more images (e.g., icons and/or screenshots) associated with the application. The search system 102 may also retrieve statistical data from the data sources 126. Statistical data may include any numerical data related to an application, such as a number of downloads, download rates (e.g., downloads per month), a number of reviews, and a number of ratings. In some examples, data retrieved from the data sources 126 may include information regarding the functionalities of applications 146.

As described above, the privacy system 110, the user devices 104, the search system 102, and the data sources 126 may be in communication with one another via the network 112. The network 112 may include various types of networks, such as a wide area network (WAN) and/or the Internet. Although the network 112 may represent a long range network (e.g., Internet or WAN), in some implementations, the network 112 may include a shorter range network, such as a local area network (LAN). In one embodiment, the network 112 uses standard communications technologies and/or protocols. Thus, the network 112 can include links using technologies such as Ethernet, Wireless Fidelity (WiFi) (e.g., 802.11), worldwide interoperability for microwave access (WiMAX), 3G/4G, Long Term Evolution (LTE), digital subscriber line (DSL), asynchronous transfer mode (ATM), InfiniBand, PCI Express Advanced Switching, etc. Similarly, the networking protocols used on the network 112 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In other examples, the network 112 can use custom and/or dedicated data communications technologies instead of, or in addition to, the ones described above.

FIG. 2 shows an exemplary application search module 116 which may be included in the search system 102 in some embodiments. The application search module 116 includes a query analysis module 202, an application set generation module 204 (hereinafter "set generation module 204"), and an application set processing module 206 (hereinafter "set processing module 206"). The query analysis module 202 analyzes a received search query 208. The set generation module 204 identifies a set of application identifiers 306 (see FIG. 3A) representative of applications based on the received query 208. The identified set of applications may be referred to herein as a "consideration set." The set processing module 206 processes (e.g., scores) the consideration set to generate a set of search results 210 that may include a list of applications along with corresponding result scores 140 (see FIG. 1) indicating the relative rank of each application 146 in the list.

As described above, the application record data store 114 includes data related to a plurality of different applications 146. The data associated with an application 146 may be referred to herein as an "application record" (e.g., application record 302a of FIG. 3A). Accordingly, the application record data store 114 may include a plurality of different application records that each include data related to a different application.

FIGS. 3A-3B show exemplary application records 302a and 310, respectively, in some embodiments. Referring to FIG. 3A, an example application record 302a includes an application name 304, an application identifier 142, and application attributes 308. The application record 302a may generally represent data stored in the application record data store 114 that is related to an application. The application record data store 114 may include a plurality of application records having a similar structure as the application record 302. Put another way, the application record data store 114 may include a plurality of application records having an application name 304, an application identifier 142, and application attributes 308.

The application name 304 may be the name of the application represented by the data in the application record 302. Example application names may include "GOOGLE MAPS," "FACEBOOK," "TWITTER," "MICROSOFT WORD," or "ANGRY BIRDS." The application identifier 142 (hereinafter "application ID 306") identifies the application record 302 amongst the other application records included in the application record data store 114. For example, the application identifier 142 may uniquely identify the application record 302. The application ID 306 may be a string of alphabetic, numeric, and/or symbolic characters (e.g., punctuation marks) that uniquely identify the application record 302 in which the application ID 306 is included.

The application attributes 308 may include any type of data that may be associated with the application represented by the application record 302. The application attributes 308 may include a variety of different types of data. For example, the application attributes 308 may include structured, semi-structured, and/or unstructured data. The application attributes 308 may include information that is extracted or inferred from documents retrieved from the data sources 126. In some examples, the application attributes 308 may include data that is manually generated. The application attributes 308 may be updated so that up to date results can be provided in response to a user search query 208.

The application attributes 308 may include the name of the developer of the application, the publisher of the application, a category (e.g., genre) of the application 146, a description of the application (e.g., a developer's description), a version of the application, the operating system for the application 146, and the price of the application 146. The application attributes 308 may also indicate security or privacy data about the application, battery usage of the application 146, and bandwidth usage of the application 146.

The application attributes 308 may include application statistics. Application statistics may refer to numerical data related to the application. For example, application statistics may include, but are not limited to, a number of downloads, a download rate (e.g., downloads per month), a number of ratings, and a number of reviews. The application attributes 308 may also include information retrieved from websites such as reviews associated with the application, articles associated with the application (e.g., wiki articles), or other information. The application attributes 308 may also include digital media related to the application, such as images (e.g., icons and/or screenshots) and/or video.

FIG. 3B shows an example application record 310 for the application (e.g., game) named "ANGRY BIRDS." The application record 310 includes the application name "ANGRY BIRDS" indicated at 312. The application record 310 includes an application identifier number indicated at 314. The application record 310 includes application attributes 316. The application attributes 316 include data fields for the name of the developer and the genre of the application. The developer of the application included in the application attributes 316 may be "ROVIO ENTERTAINMENT." The genre of the application may be "games." The application attributes 316 also includes fields for description and reviews. The description may include text that describes "ANGRY BIRDS." In some examples, the description may be provided by the developer of the application. The field for reviews may include text from user reviews in some examples.

The application attributes 316 also includes fields for application statistics, such as ratings and the number of downloads. The ratings field may indicate the ratings given to the application 146 by the users. For example, the ratings may include a number of stars (e.g., 0-5 stars) assigned to the application 146 by users. The number of downloads may indicate the total number of times the application has been downloaded.

Referring back to FIG. 2, the search query 208 received by the application search module 116 may be used to perform an application search of the application record data store 114. For example, the query analysis module 202 receives the query 208. The query analysis module 202 may perform various analysis operations on the received query 208. For example, analysis operations performed by the query analysis module 202 may include, but are not limited to, tokenization of the query, filtering of the query, stemming, synonymization, and stop word removal.

The search query 208 may be a query entered by a user on a user device 104. The search query 208 may include text, numbers, and/or symbols (e.g., punctuation) entered into the user device 104 by the user. For example, the user may have entered the search query 208 into a search field (e.g., a search box) of a search system interface running on the user device 104 using a touchscreen keypad, a mechanical keypad, and/or via speech recognition. In some examples, a user device 104 may transmit additional data along with the search query 208. The search query 208 and the additional data may be referred to as a query wrapper. The query wrapper may include information associated with the search query 208, such as platform information (e.g., device type, operating system version, and web-browser version), user agent, geo-location information, partner specific information, and other information. The search system 102 may receive the query wrapper in some examples. The search system 102 may use the additional information included in the query wrapper to generate search results.

The set generation module 204 identifies a set of applications (i.e., the consideration set) based on the search query 208. In some examples, the set generation module 204 may identify the set of applications by identifying application records 302 based on matches between terms of the search query 208 and terms in the application records 302. For example, the set generation module 204 may identify a set of applications 146 in the application record data store 114 based on matches between tokens generated by the query analysis module 202 and words included in the application records 302. The consideration set of applications 146 may be a list of application records 302 in some examples. For example, the consideration set may be a list of application identifiers 306 and/or a list of application names 304.

The set processing module 206 performs a variety of different processing operations on the consideration set to generate a set of search results 210 that includes a list of applications 146. In some implementations, the set processing module 206 may generate a result score 140 for each of the applications 146 included in the consideration set in order to generate the set of search results 210. In these implementations, the set of search results 210 may include a list of applications 146 (e.g., application identifiers 306 and/or application names 304), each of which is associated with a corresponding result score 140. In some examples, the search results 210 may include all of the applications 146 identified in the consideration set. In other examples, the search results 210 may include a subset of the consideration set. For example, the subset may be the application identifiers 306 for those applications 146 having the largest result scores.

Information conveyed by the search results 210 may depend on how the result scores 140 are calculated by the set processing module 206. For example, the result scores 140 may indicate the relevance of an application 146 to the search query 208, the popularity of an application 146, the quality of an application 146, or other properties of the application 146, depending on what parameters the set processing module 206 uses to score the applications 146.

The set processing module 206 may generate result scores for applications 146 in a variety of different ways. In general, the set processing module 206 may generate a result score 140 for an application 146 based on one or more scoring features. The scoring features may be associated with the application 146 and/or the search query 208. An application scoring feature may include any data associated with an application 146. For example, application scoring features may include any of the application attributes 308 included in the application record 302 or any additional parameters related to the application, such as data indicating the popularity of an application 146 (e.g., number of downloads) and the ratings (e.g., number of stars) associated with an application 146. A query scoring feature may include any data associated with the search query 208. For example, query scoring features may include, but are not limited to, a number of words in the search query 208, the popularity of the search query 208, and the expected frequency of the words in the search query 208. An application-query scoring feature may include any data which may be generated based on data associated with both the application 146 and the search query 208 that resulted in identification of the application record 302 by the set generation module 206. For example, application-query scoring features may include, but are not limited to, parameters that indicate how well the terms of the search query 208 match the terms of the identified application record. The set processing module 206 may generate a result score 140 for an application 146 based on at least one of the application scoring features, the query scoring features, and the application-query scoring features.

The set processing module 206 may determine a result score 140 based on one or more of the scoring features listed herein and/or additional scoring features not explicitly listed. In some examples, the set processing module 206 may include one or more machine learned models (e.g., a supervised learning model) configured to receive one or more scoring features. The one or more machine learned models may generate result scores based on at least one of the application scoring features, the query scoring features, and the application-query scoring features. For example, the set processing module 206 may pair the search query 208 with each application and calculate a vector of features for each (query, application) pair. The vector of features may include application scoring features, query scoring features, and application-query scoring features. The set processing module 206 may then input the vector of features into a machine-learned regression model to calculate a result score that may be used to rank the application 146 in the search results 210 for the search query 208.

The results scores 140 may be used in a variety of different ways. In some examples, the result scores 140 may be used to rank the applications 146 in a list of results 210 that is presented on a user device 104. In these examples, a larger result score 140 may indicate that the application 146 is more relevant to a user than an application 146 having a smaller result score 140. In examples where the search results 210 are displayed as a list on a user device 104, the application names 304 associated with larger result scores 140 may be listed nearer to the top of the results list 210 (e.g., near to the top of the screen). In these examples, application names 304 associated with lower result scores 140 may be located farther down the list (e.g., off screen) and may be accessed by a user scrolling down the screen 108a of the user device 104.

The set of search results 210 may be transmitted to a user device 104 that generated the search query 208 upon which the search results 210 are based. The search results 210 may be formatted on a user device 104 as a list of application names 304 matching the search query 208. The search results 210 may include any information corresponding to the various applications 146. For example, the search results 210 provided by the search system 102 to a user device 104 may be formatted as a list of application identifiers 306, including, for example, a name 306 of the application 146, an image associated with the application 146 (e.g., an icon, a screenshot, and/or a video), a link to download the application 146, a description and rating of the application 146, and/or other information.

Figure 4:
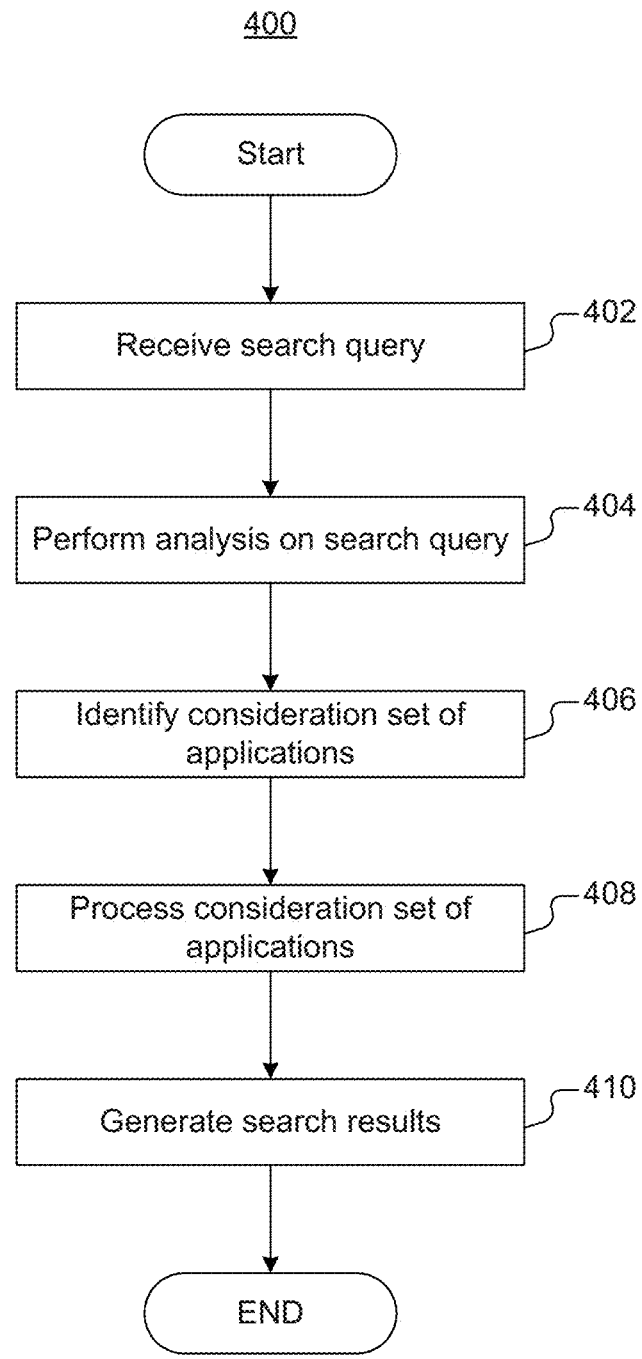
FIG. 4 is a flow diagram illustrating a method of searching in some embodiments.

FIG. 4 is a flow diagram illustrating a method 400 of searching in some embodiments. The method 400 is described with reference to the application search module 116 of FIG. 2. In step 402, the query analysis module 202 receives a search query 208 generated by a user device 104. In step 404, the query analysis module 202 analyzes the search query 208.

In step 406, the set generation module 204 identifies a consideration set of applications 146 (e.g., a set of application records) based on the search query 208 (e.g., based on output from the query analysis module 202). In step 408, the set processing module 206 processes the consideration set of applications 146. For example, the set processing module 206 may generate a result score 140 for each of the application names 304 in the consideration set. In step 410, the set processing module 206 generates a set of search results 210. The search results 210 may include a list of application identifiers 306 and associated result scores 140. The search system 102 may then transmit the search results 210 to a user device 104.

Figure 5:
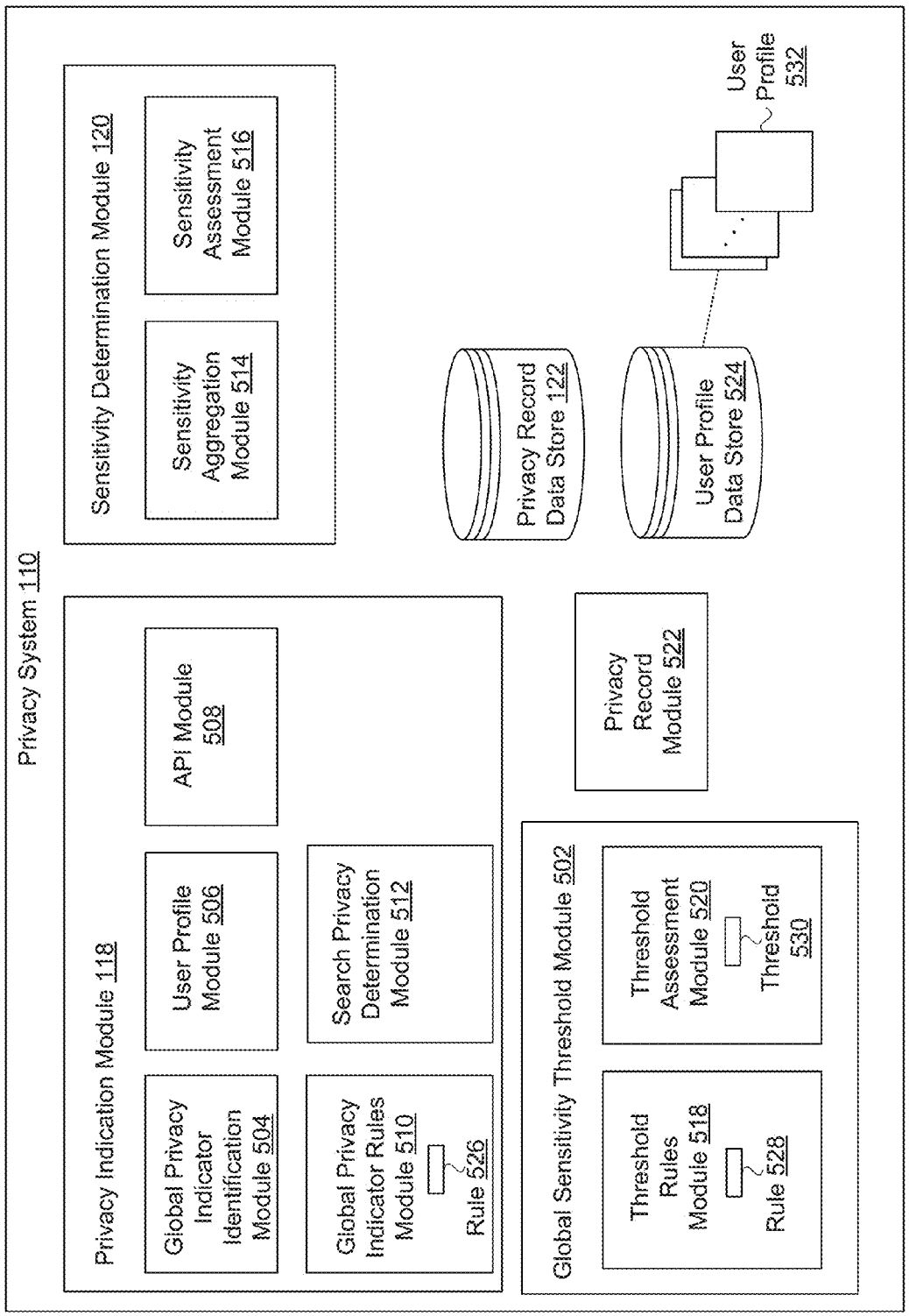
FIG. 5 is a functional block diagram of a privacy system in some embodiments.

FIG. 5 is a functional block diagram of a privacy system 110 in some embodiments. The privacy system 110 may include a privacy indication module 118, a sensitivity determination module 120, a global sensitivity threshold module 502, a privacy record module 522, a privacy record data store 122, and a user profile data store 524. The privacy indication module 118 may retrieve and provide any number of privacy indicators 148. In some embodiments, the privacy indication module 118 may provide global privacy indicators or user privacy indicators 148 associated with any number of applications 146. The privacy indication module 118, for example, may provide global privacy indicators or user privacy indicators 148 associated with a search for applications 146.

A global privacy indicator may indicate an intent regarding privacy of information associated with an application 146. The global privacy indicator may be based on a population of users or determined by an application developer or administrator. The global privacy indicator may represent a general privacy expectation of a population. A user privacy indicator is a privacy indicator 148 that is set for and/or by an individual user for an associated application 146.

The privacy indication module 118 may include a global privacy indicator identification module 504, a user profile module 506, an API module 508, a global privacy indicator rules module 510, and a search privacy determination module 512. The global privacy indicator identification module 504 may be configured to provide one or more global privacy indicators.

Figure 5A:
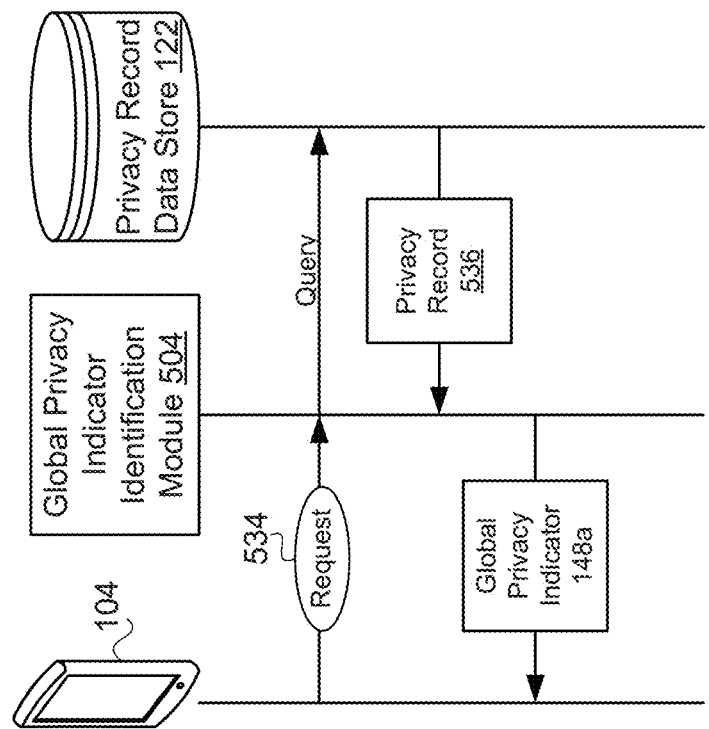
FIG. 5A is a flow diagram illustrating an example method for providing a global privacy indicator in some embodiments.

FIG. 5A is a flow diagram illustrating an example method for providing a global privacy indicator in some embodiments. The global privacy indicator identification module 504 may receive a privacy indicator request 534 (e.g., the privacy indicator request 130 in FIG. 1) for a global privacy indicator associated with an application identifier 142. The global privacy indicator identification module 504 may retrieve a privacy record 536 (e.g., from the privacy record data store 122 via the privacy record module 522) based on the application identifier 142. The global privacy indicator identification module 504 may identify a global privacy indicator based on the privacy record 536 and provide the global privacy indicator to the requester or any digital device 104.

In various embodiments, a user may view the search results and related privacy indicators on the digital device 104. The privacy indicator associated with an application may provide the user assurance that information may not be shared with others (e.g., friends, advertisers, or the like) regarding the user's installation and/or use an application that is identified as private. As a result, the user may be encouraged to install and/or use the application. The user may also have the option to change the privacy indicator of an application that is downloaded (e.g., from a default privacy indicator provided by the global privacy indicator identification module 504) to a user privacy indicator to make data regarding installation or use of the application more or less private.

Figure 5B:
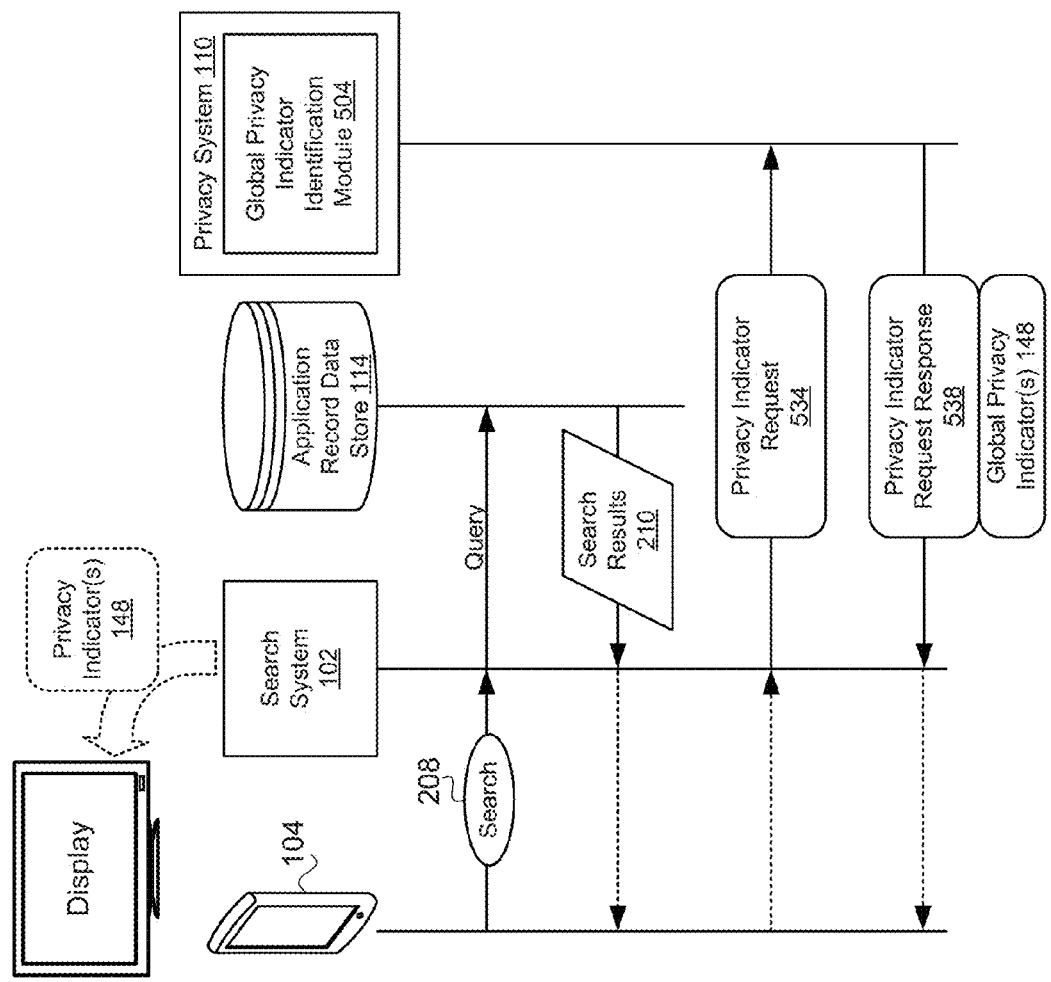
FIG. 5B is a flow diagram illustrating another example method for providing a global privacy indicator in some embodiments.

FIG. 5B is a flow diagram illustrating another example method for providing a global privacy indicator in some embodiments. The search system 102 may receive the search query 208 from the user device 104. The search system 102 may generate search results 210 including a set of application identifiers 142. The search system 102 and/or the user devices 104 may generate a privacy indicator(s) request 534 (e.g., the privacy indicator request 130 in FIG. 1) including a list of any or all of the set of application identifiers 142 of the search results 210. The search system 102 and/or the user device 104 may provide the privacy indicator request 534 to the privacy system 110 (e.g., to the global privacy indicator identification module 504). The global privacy indicator identification module 504 may retrieve privacy records for one or more of the applications 146 associated with the application identifiers 142 of the privacy indicator request 534. The global privacy indicator identification module 504 may then generate a privacy indicator request response 538 (e.g., the privacy indicator request response 132 of FIG. 1) including the global privacy indicators from the retrieved privacy records. The search system 102 and/or the user device 104 may display the search results (e.g., the application identifiers) with any or all of the associated global privacy indicators from the global privacy indicator identification module 504. In various embodiments, the global privacy indicator identification module 504 may provide global privacy indicators to any digital device 104.

In some implementations, before an installed application on the digital device 104 shares or otherwise provides at least some potentially private information, application developers may enable the application to identify a privacy indicator (e.g., if present on the digital device 104) or to provide the privacy indicator request 534 to the privacy system 110 to retrieve a global privacy indicator 148 (e.g., if a privacy indicator is not present on the digital device 104). The application may determine to share or otherwise provide information (e.g., to the application developer, social networks, recommendation software, or advertising networks) based on the privacy indicator.

In various embodiments, a service or another application may scan applications and/or application usage for any number of applications on a digital device 104 in order to provide the information to one or more third parties (e.g., for advertising, demographic information, application development, sharing with friends, or the like). The service or other application may request and/or retrieve any number of privacy indicators for any number of the applications on the digital device 104 prior to collection of information and/or prior to providing information that is collected. The service or other application may determine whether to collect information and/or provide information associated with each particular application based on that particular application's privacy indicator.

An operating system of the digital device 104 may display and/or enable functionality based on one or more privacy indicator. For example, the operating system of the digital device 104 may retrieve a privacy indicator for an application, provide the privacy indicator request 534 to retrieve a privacy indicator, or be provide a privacy indicator by an application on the digital device 104. The operating system may limit notifications, alerts, and/or other messages for a particular application based on that application's privacy indicator.

In some embodiments, the operating system may support multiple user accounts and provide access to different information and/or applications depending on the user that is currently logged in based on the privacy indicator. For example, the operating system may determine to display an application on a home screen (and/or information about application usage) based on the current user logged into the digital device 104 and the privacy indicator of that application. In some embodiments, the operating system may determine permissions for any number of users of the digital device 104 to view, access, or make changes to a particular application based on that particular application's privacy indicator.

Figure 5C:
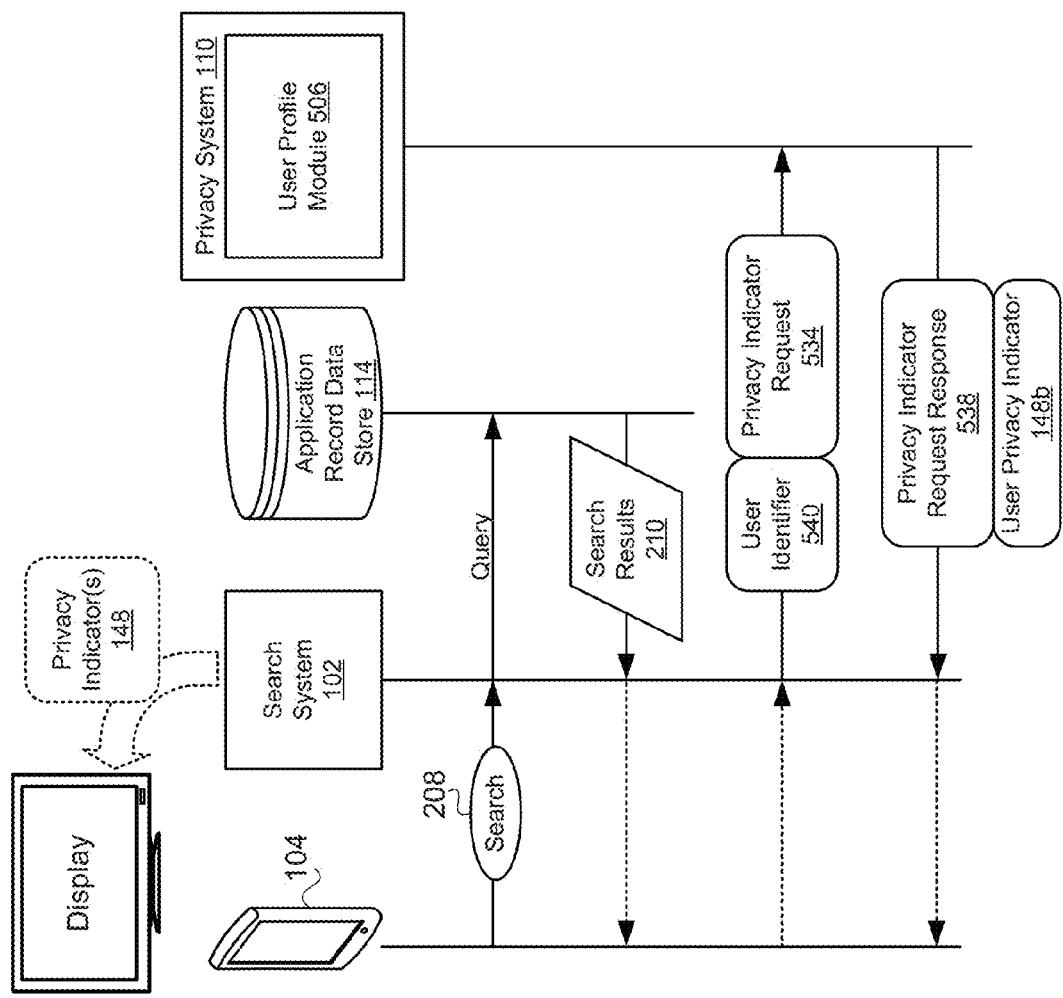
FIG. 5C is a flow diagram illustrating an example method for providing one or more user privacy indicators based on a user identifier in some embodiments.

The optional user profile module 506 may provide one or more user privacy indicators 148 based, at least in part, on a user identifier. FIG. 5C is a flow diagram illustrating an example method for providing one or more user privacy indicators 148 based on a user identifier in some embodiments. The user profile module 506 may receive a user identifier 540 and a privacy indicator request 534 for a user privacy indicator 148 associated with an application 146 and the user identifier 540. The user profile module 506 may retrieve a user profile (e.g., from the user profile data store 524) based on the user identifier 540. The user profile module 506 may identify a user privacy indicator 148 associated with the user profile based on the application identifier 142 and provide the user privacy indicator 148 to the requester or any digital device 104. A user identifier may be any identifier that is associated with a user. For example, the user identifier may be a unique number, a unique code, a username, an account number, or the like. In another example, the identifier may comprise a combination of letters and numbers.

User privacy indicators may, themselves, be private. In some implementations, all or some of the user privacy indicators may be maintained on a user device (e.g., user device 104) and may not be stored or shared with the privacy system 110.

Figure 5D:
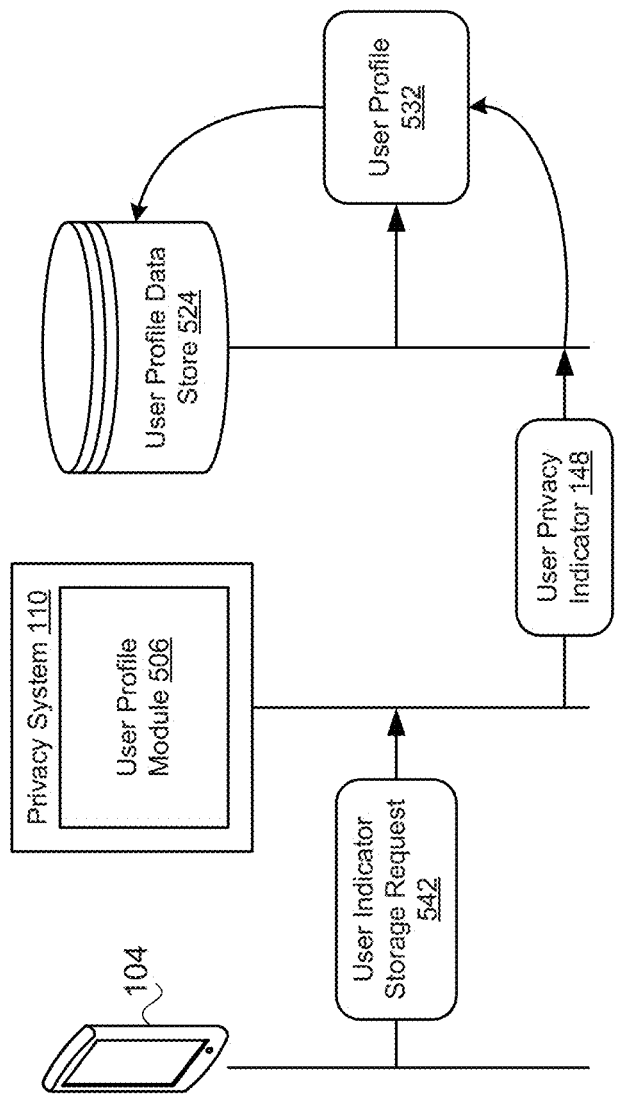
FIG. 5D is a flow diagram illustrating an example method for providing security for user privacy indicators in some embodiments.

The privacy indication module 118 may provide security for user privacy indicators 148. FIG. 5D is a flow diagram illustrating an example method for providing security for user privacy indicators 148 in some embodiments. The user profile module 506 may authenticate a communication including or requesting user privacy indicators 148 (e.g., utilizing a username and a password authenticated with information associated with the user from the user profile data store 524). In various implementations, the user profile module 506 encrypts and/or decrypts the user privacy indicators 148. For example, the user profile module 506 may communicate with a user device 104 via an encrypted communication channel (e.g., https or the like). The user profile module 506 may authenticate and/or decrypt the privacy indicator request 534 from the user device 104 (e.g., utilizing an encryption key). The user profile 506 may, in some embodiments, authenticate and/or decrypt the user identifier within the privacy indicator request 534. The user profile module 506 may retrieve and/or decrypt one or more user privacy indicators 148 from the user profile data store 524. The user profile module 506 may, in some embodiments, retrieve an encryption key associated with the user (e.g., from the user's profile 532), encrypt a response including the retrieved user privacy indicators 148, and provide the response 538 to the user device 104.

In various implementations, the user profile module 506 may receive one or more user privacy indicators 148 for storage in non-transitory memory. In some examples, the user profile module 506 may receive a user indicator storage request 542 (e.g., the user indicator storage request 134 of FIG. 1) from a user device 104. The user indicator storage request 542 may request that the privacy indication module 118 store a user privacy indicator 148 associated with the user in the user's profile. The user profile module 506 may authenticate and/or decrypt the privacy indicator storage request 542 and/or the user privacy indicator(s) 148 within the request 542. The user profile module 506 may select a user profile (e.g., from within the user profile data store 524) based on a user identifier associated the privacy indicator storage request 542 and store the user privacy indicator(s) 148 within the user profile 532.

The application programming interface (API) module 508 is configured to receive API messages (e.g., API calls) from any digital device (e.g., data sources 126 and/or user devices 104). The API module 508 may receive, for example, API calls from databases, applications, social networks, other privacy systems 110, search systems 102, user devices 104, or the like. The API calls may request any number of global privacy indicator(s) and/or user profile indicator(s). For example, a social network 128d may receive information that a user has downloaded and/or installed an application 146. Prior to sharing the information about the user, the social network 128d may provide the privacy system 110 with a global privacy indicator request (e.g., via the global privacy indicator identification module 504) or an API call (e.g., via the API module 508) requesting a global privacy indicator associated with the downloaded and/or installed application 146. The API module 508 and/or the global privacy indicator identification module 504 may provide the requested global privacy indicator. Based on the global privacy indicator, the social network 128d may determine to share the information that the application 146 was downloaded (e.g., download information), installed (installation information), or used (e.g., use information) by the user. Alternately, based on the global privacy indicator (e.g., the global privacy indicator indicating that the associated application is generally considered private and/or that information related to the application is generally requested to be private), the social network 128d may determine not to share the information.

Any number of digital devices may request global privacy indicator(s) and/or user profile indicator(s). In various implementations, the API module 508 may be configured to receive API calls to store (e.g., in non-transitory memory) global privacy indicator(s) and/or user profile indicator(s).

The API module 508 may be optional. In some examples, the global privacy indicator identification module 504 may be responsive to API communications for global privacy indicator(s) and the user profile module 506 may be responsive to API communications for user privacy indicators(s).

The global privacy indicator rules module 510 may retrieve applicable rule(s) and/or utilize the applicable rule(s) that may affect global privacy indicator(s) and/or user profile indicator(s). One or more rules may override a privacy indicator regardless of the previously stored and/or determined privacy indicators 148.

For example, certain countries may require that information regarding one or more applications 146 be considered private (e.g., medical records). In various implementations, the global privacy indicator rules module 510 may determine that a rule is applicable based on information from a requesting device and may apply the applicable rule. For example, in various embodiments, a digital device requesting one or more privacy indicators may provide a country code, IP address, or the like that is associated with a country. Based on the information, the global privacy indicator rules module 510 may retrieve and/or apply any applicable rules based on that country. In another example, a digital device may request one or more privacy indicators and provide a geographic code (e.g., indicating states, localities, or the like which may have different rules or laws). The global privacy indicator rules module 510 may retrieve and/or apply any applicable rules based on provided information (e.g., codes).

In some implementations, each search system 102, user device 104, data sources 126, and/or other digital devices that may request privacy indicators 148 is associated with an account or profile. The account or profile may include information related to one or more rules (e.g., country that the digital device operates in or rules applicable to various people or roles in a company). The global privacy indicator rules module 510 may receive a request for one or more privacy indicators 148 with an identifier (e.g., a digital device identifier, user identifier, and/or IP address). Based on the identifier, the global privacy indicator rules module 510 may retrieve one or more rules 526.

In various implementations, the global privacy indicator rules module 510 determines if one or more rules apply. For example, Germany may require that information associated with medical applications be private. The global privacy indicator identification module 504 may retrieve any number of global privacy indicators based on application identifiers 142 of a privacy indicator request 534. The global privacy indicator rules module 510 may retrieve any potentially applicable rules based on identifiers or other information in or associated with the privacy indicator request 534. For example, after identifying a rule that requires all information associated with medical applications are to be private, the global privacy indicator rules module 510 may scan the application identifiers 142 to determine if any application 146 associated with the application identifiers 142 are medical applications. If there are no medical applications, the global privacy indicator rules module 510 may not apply any rules 526. If one or more of the application identifiers 142 is a medical application, the global privacy indicator rules module 510 may change or require that the related global privacy indicator(s) associated with the medical applications indicate private (e.g., regardless of the previously determined value that may be stored in the privacy record data store 122).

The global privacy indicator rules module 510 may receive, maintain, retrieve, and/or utilize any rule 526. Any rule 526 may override and/or otherwise require a specific privacy indicator 148 regardless of the global privacy indicator 148 and/or user profile indicator. In some examples, legal regulations may require information regarding a group or genre (e.g., a category) of application to be considered private. One or more networks (e.g., social networks), application developers, politicians, companies, schools, parents, or the like may wish to consider information regarding a set of applications private. In additional examples, a social network may wish to keep information regarding a set of applications 146 be private but only on their network. To illustrate, the global privacy indicator rules module 510 may apply a rule indicating that a category of applications are to always indicate a desire for privacy on a specific social network 128*d* (e.g., only on FACEBOOK®) while other social networks may not rely on the rule but utilize on a global privacy indicator.

In various implementations, any digital device or an administrator may establish rules 526 for the global privacy indicator rules module 510. In some examples, an application developer, parent, or the like may log onto the privacy indication module 118 and may provide any number of rules for different applications 146 and/or circumstances. For example, a parent or guardian may generate a rule that information regarding the downloading and/or installation of an application 146 of a specific child should be private.

The search privacy determination module 512 may be configured to identify a search query 208 as a private search and provide a search privacy indicator. For example, a search system 102 may conduct a search based on a query from a user device 104. The search system 102 may provide a set of application identifiers 142 from the search results 210 to the privacy system 110. The global privacy indicator identification module 504 may retrieve any number of global privacy indicators associated with any or all of the set of application identifiers 142. If all of the global privacy indicators are indicative of expected privacy, the search privacy determination module 512 may determine that the search is also private based on the retrieved global privacy indicators and generate a search privacy indicator that may be provided to a digital device (e.g., the search system 102 and/or the user device 104). A determination of a search as being private may be based on global privacy indicators associated with a sampling of application identifiers from the search results, a majority, or in any other manner.

A user may be encouraged to search for different applications if the search query is private. As a result, some users may be encouraged to search for, discover, install, and/or use applications. In some embodiments, if the search query is private, information regarding the search query may not be collected, stored, and/or used. For example, the digital device 104 may not store the search in a search history. In another example, the privacy indication module 118 of the privacy system 110 may not store information regarding a private search in the user's profile. Further, in some embodiments, information regarding the private search may not be collected or used for targeted advertising and/or recommending featured applications.

The search privacy determination module 512 may determine whether a search query 208 is private based on any information including the identity of the requester (e.g., the identity of the user), key words used in the search (e.g., indicating that the search is to be private), or based on all or some of the global privacy indicator(s) related to application identifiers 142 from the search results 210.

In some implementations, the search privacy determination module 512 weights and/or calculates a search sensitivity value based on the global privacy indicator(s) associated with the search results 210. The search sensitivity value may be any value (e.g., number) based on an aggregation of privacy indictors of any number of the global privacy indicator(s) associated with the search results. The search privacy determination module 512 may determine that the search query is private or not private based on the sensitivity value (e.g., by comparing the sensitivity value to a predetermined search threshold of the global sensitivity threshold module 502).

The sensitivity determination module 120 may determine a sensitivity value associated with an application 146. A sensitivity value may be any numeric value indicating a degree (e.g., an intensity) of sensitivity related to sharing or publishing information associated with an application or search. In one example, a high sensitivity value may indicate that a user or population of users request and/or strongly prefer that information associated with their search, selection, installation, and usage of an application not be shared or published.

The sensitivity value may quantify sensitivity in any manner. In some implementations, low sensitivity values may indicate a high degree of sensitivity while high sensitivity values may indicate a low degree of sensitivity. In various implementations, sensitivity values may be integers representing a level of sensitivity. In one example, sensitivity values may range between 1-10 integers, one being the lowest sensitivity and 10 being the highest.

The sensitivity determination module 120 may include a sensitivity aggregation module 514 and a sensitivity assessment module 516. The sensitivity aggregation module 514 may be configured to generate a privacy score and/or aggregate sensitivity values for an application based on user privacy indicators and/or sensitivity values. In some embodiments, the sensitivity aggregation module 514 determines a privacy indicator for an application based on global privacy indicators and/or sensitivity values.

The sensitivity aggregation module 514 may receive privacy indicators 148 (e.g., user privacy indicators) and sensitivity values associated with any number of users. In some implementations, any number of users may be asked to provide privacy indicators 148 (e.g., user privacy indicators) and/or sensitivity values associated with an application 146. For example, when users search for applications 146, and/or view application information, an interface (e.g., on a digital device, on a website, and/or in an application store) may request that the user input a privacy indicator and/or a sensitivity value. The privacy indicator 148 may, for example, indicate whether the user would consider sharing and/or publishing at least some information associated with search, selection, installation, and/or usage of the associated application to be private. The sensitivity value may, for example, indicate a degree or intensity that a user would consider sharing and/or publishing at least some information associated with search, selection, installation, and/or usage of the associated application 146 to be private. In some implementations, if the user inputs a privacy indicator 148 associated with one or more applications 146, the inputted privacy indicator 148 may be stored as a user privacy indicator 148 (e.g., stored in a user profile associated with the user).

The sensitivity aggregation module 514 may receive any number of privacy indicators 148 and/or sensitivity values 124 and generate a privacy indicator 148 based on the privacy indicators 148 and/or sensitivity values 124. In some implementations, the sensitivity aggregation module 514 aggregates privacy indicators 148 and/or sensitivity values 124 to generate an aggregate sensitivity value. The sensitivity aggregation module 514 may aggregate the privacy indicators 148 and/or sensitivity values 124 in any number of ways. The aggregation of privacy indicators 148 and/or sensitivity values 124 associated with an application 146 may be stored in one or more application records 302 by the privacy record module 522.

In some implementations, the sensitivity aggregation module 514 generates a privacy indicator 148 based on other received privacy indicators and/or sensitivity values 124. For example, the sensitivity aggregation module 514 may determine a global privacy indicator based on a majority of a group of privacy indicators and/or sensitivity values 124.

The sensitivity assessment module 516 may be configured to generate a global privacy indicator and/or aggregate sensitivity values for an application 146 based on received privacy indicators and/or aggregate sensitivity values associated with other applications. Many applications may be related. For example, an application 146 may be an updated or may be a different version of another application 146*a* (e.g., the ANGRY BIRDS STAR WARS II application is a different version of the ANGRY BIRDS application). The other application 146*a* may be associated with a different privacy indicator (e.g., privacy indicator 148*a*). Similarly, the application 146 may be similar to application 146*b*. Application 146*b* may be associated with another privacy indicator 148. In another example, many applications may be related by genre (e.g., category) such as adult applications, gambling applications, medical applications, children's applications, social network applications, or the like. Applications may be related to each other in many different ways including, but not limited to, by application developer, title, subject matter, rating, or description. Similar applications may have similar global privacy indicators.

In various implementations, the sensitivity assessment module 516 receives an application identifier 142. In some examples, the sensitivity assessment module 516 receives an application identifier 142 from any digital device (e.g., as a part of an application search, viewing an application 146, or a determination of whether to share information associated with the identified application 146). The sensitivity assessment module 516 may determine a privacy indicator 148 or a global sensitivity value 124 based on applications that are similar to the identified application 146.

The sensitivity assessment module 516 may identify application similar to the identified application 146 in any number of ways. In various implementations, the sensitivity assessment module 516 may determine if an administrator or software developer has established any rules (e.g., from the global privacy indicator rules module 510) defining similar applications for the purposes of assigning global privacy indicator(s). For example, the software developer of the ANGRY BIRDS® game may generate a rule that indicates that all applications 146 related to the ANGRY BIRDS® game or the ANGRY BIRDS® franchise are similar to each other and/or may be assigned similar global privacy indicators.

In another example, different applications may be related by category or subject matter. Categories may be defined, for example, by an administrator, one or more users, or an operator of an application store (e.g., GOOGLE PLAY® or APPLE ITUNES®). The subject matter of an application 146 may be defined by the application developer, title of the application, description of an application, administrator, and/or operator of an application store.

After the sensitivity assessment module 516 identifies similar applications to the application 146 identified by the application identifier, the sensitivity assessment module 516 may retrieve global privacy indicators for all or some of the similar applications from the global privacy indicator identification module 504. The sensitivity assessment module 516 may generate a privacy indicator 148 based on the retrieved global privacy indicators (e.g., by averaging or otherwise aggregating the global privacy indicators).

The sensitivity assessment module 516 may assign weight to different privacy indicators 148 based on a degree of similarity between applications. For example, the sensitivity assessment module 516 may assign high weight to a privacy indicator 148 of a very similar application (e.g., same subject matter, category, and developer) while applying a lower weight to privacy indicators 148 of applications that are not as similar (e.g., an application that may share similar subject matter but be in a different category). The sensitivity assessment module 516 may assess weighted and/or unweighted privacy indicators 148 of similar applications to generate a new global privacy indicator.

In some implementations, the sensitivity assessment module 516 receives sensitivity values for all or some of the similar applications (e.g., from the application records 302 and/or users). The sensitivity assessment module 516 may generate a sensitivity value 124 (e.g., an aggregate sensitivity value) based on the received sensitivity values (e.g., by averaging or otherwise aggregating the sensitivity values of the similar applications).

As similarly discussed regarding privacy indicators 148, the sensitivity assessment module 516 may assign weights to different sensitivity values 124 based on a degree of similarity between applications. For example, the sensitivity assessment module 516 may assign a high weight to a sensitivity value 124 of a very similar application (e.g., same subject matter, category, and developer) while applying a lower weight for applications that are not as similar (e.g., an application that may share similar subject matter, but be in a different category). The sensitivity assessment module 516 may assess weighted and/or unweighted sensitivity values to generate the aggregate sensitivity value.

The sensitivity aggregation module 514 and/or the sensitivity assessment module 516 may generate and/or initiate a process to generate a global privacy indicator and/or an aggregate sensitivity value of an application 146 at any time. For example, the sensitivity aggregation module 514 and/or the sensitivity assessment module 516 may generate and/or initiate a process to generate the global privacy indicator and/or the aggregate sensitivity value periodically (e.g., at predetermined or established times, at predetermined or threshold time intervals, or at a duration of time since the last global privacy indicator and/or the aggregate sensitivity value was determined). In another example, the sensitivity aggregation module 514 and/or the sensitivity assessment module 516 may generate and/or initiate a process to generate the global privacy indicator and/or the aggregate sensitivity value after receiving a number of user privacy indicators 148 and/or sensitivity values 124 for one or more applications 146. Further, in another example, an application 146 may be assigned a global privacy indicator and/or an aggregate sensitivity value when added to an application store.

In various implementations, the sensitivity aggregation module 514 and/or the sensitivity assessment module 516 will not generate a global privacy indicator or aggregate sensitivity value, because of a rule from the global privacy indicator rules module 510. For example, an application developer 126a may assign a global privacy indicator to an application 146 that may not be globally altered (e.g., the maker of an adult application may assign a privacy indicator indicating that the information regarding the application is always private or is at a specific privacy level). In this example, the sensitivity aggregation module 514 and/or the sensitivity assessment module 516 may determine if there are any applicable rules before generating or initiating a process to generate a global privacy indicator and/or an aggregate sensitivity value of the application 146.

The sensitivity aggregation module 514 and/or the sensitivity assessment module 516 may or may not generate a global privacy indicator or aggregate sensitivity value for an application 146 if that same application is already associated with a global privacy indicator. In some embodiments, the sensitivity aggregation module 514 and/or the sensitivity assessment module 516 generates a global privacy indicator or aggregate sensitivity value for applications 146 without global privacy indicators. In various examples, the sensitivity aggregation module 514 and/or the sensitivity assessment module 516 generates a global privacy indicator or aggregate sensitivity value for applications 146 with global privacy indicators. If the generated global privacy indicator or the aggregate sensitivity value for an application 146 indicates a change in the previously existing global privacy indicator, the privacy system 110 may update the global privacy indicator accordingly and/or notify a user (e.g., an administrator, another digital device or the like) of the change.

The global sensitivity threshold module 502 is configured to compare an aggregate sensitivity value from the sensitivity aggregation module 514 or the sensitivity assessment module 516 with one or more thresholds 530. A global privacy indicator may be based on the comparison. The global sensitivity threshold module 502 may generate and/or utilize any number of thresholds 530.

A threshold 530 may indicate a predetermined value or a range. For example, any sensitivity value 124 over a top threshold 530 may indicate a strong intent that information regarding an application 146 be maintained as private (e.g., information regarding the application 146 should not be published or shared). A sensitivity value 124 between a middle threshold 530 and a top threshold 530 may indicate a desire that information regarding an application 146 be maintained as private but potentially sharing information with a limited number of others such as close friends. A sensitivity value 124 between the middle threshold 530 and a low threshold 530 may indicate a desire that the information regarding the application 146 not be shared with the public, while a sensitivity value 124 below a low threshold 530 may indicate that information associated with the application 146 is not to be considered private. In these examples, the global sensitivity threshold assessment module 520 may determine different global privacy indicators for the different ranges depending on the aggregate sensitivity value. In various implementations, the global sensitivity threshold assessment module 520 compares the aggregate sensitivity value from the sensitivity determination module 120 to a single threshold to determine whether information regarding the associated application 146 is requested to be or should be considered private (e.g., the global privacy indicator may be a flag which, if present, indicates an intent for privacy while a global privacy indicator without a flag may indicate a lack of such intent).

The threshold rules module 518 may include or retrieve any threshold rules 528. Threshold rules 528 are rules indicating one or more thresholds 530. A threshold rule 528 may apply to an application 146 or group of applications 146 (e.g., similar applications such as an application that is similarly categorized with similar subject matter, similar functions, similar titles, similar developers, or the like). A threshold rule 528 may be defined, for example, by an administrator or a software developer 126a (e.g., a developer of one or more applications 146).

In various implementations, the sensitivity determination module 120 or the sensitivity assessment module 516 may generate an aggregate sensitivity value for an application 146. The threshold rules module 518 may retrieve one or more threshold rules 528 associated with the application 146 (e.g., from an application record 302 that may be stored in the privacy record data store 122). The rules 528 may indicate one or more thresholds 530. The global sensitivity threshold module 502, the threshold rules module 518, and/or the threshold assessment module 520 may determine a global privacy indicator based on a comparison of the one or more thresholds 530 with the aggregate sensitivity value.

The threshold assessment module 520 may determine a threshold 530 if there are no applicable threshold rules 528. In some examples, the threshold assessment module 520 provides a default threshold 530 for comparison of any aggregate sensitivity value of an application 146 without an associated threshold rule 528.

The threshold assessment module 520 may determine any number of thresholds in any number of ways. In one example, the sensitivity aggregation module 514 may generate an aggregate sensitivity value of a particular application 146. The threshold assessment module 520 may identify similar applications or group of applications (e.g., similar applications such as applications that are similarly categorized with similar subject matter, similar functions, similar titles, similar developers, or the like). The threshold assessment module 520 may then retrieve any number of thresholds (e.g., from application privacy records) associated with the similar applications or group of applications. In various implementations, the threshold assessment module 520 may aggregate or group all or some of the thresholds of the similar applications or group of applications to generate any number of thresholds for the particular application 146 associated with the aggregate sensitivity value. The thresholds of the similar applications or group of applications may be previously determined by the threshold rules module 518. In some examples, the thresholds of the similar applications or group of applications may be previously determined by users (e.g., users who allow their personal thresholds to be considered or aggregated for generating thresholds for global privacy indicator determination).

In various implementations, the sensitivity determination module 120 or the sensitivity assessment module 516 may generate an aggregate sensitivity value for a particular application 146. The threshold assessment module 520 may determine one or more thresholds associated with applications that are similar to the particular application 146. The global sensitivity threshold module 502, the threshold rules module 518, and/or the threshold assessment module 520 may determine a global privacy indicator based on a comparison of the one or more thresholds with the aggregate sensitivity value.

The privacy record module 522 is configured to retrieve application records 302 from the privacy record data store 122 and/or retrieve user profiles from the user profile data store 524. In some examples, the privacy record module 522 may be configured to store global privacy indicator(s), user privacy indicator(s) 148, aggregate sensitivity value(s), user sensitivity value(s) 124, threshold(s), and the like within application records 302 in the privacy record data store 122. Similarly, the privacy record module 522 may be configured to store user privacy indicator(s) 148, user sensitivity value(s) 124, user threshold(s) 530, and the like within user profiles in the user profile data store 524.

The privacy record data store 122 may include one or more databases, indices (e.g., inverted indices), files, or other data structures that may be used to implement the techniques of the present disclosure. The privacy record data store 122 may store application records 302. An application record 302 may be any record, log, account, or the like, associated with one or more applications. The application record 302 may store, for example, a current global privacy indicator, past global privacy indicators, any or all sensitivity values 124, aggregate sensitivity values, threshold rules 528, thresholds 530, global privacy indicator rules 526, or the like. The privacy record data store 122 may be encrypted and/or require authentication before data may be stored or retrieved.

The user profile data store 524 may include one or more databases, indices (e.g., inverted indices), files, or other data structures that may be used to implement the techniques of the present disclosure. The user profile data store 524 may include user profiles 532. A user profile 532 may be any record, log, account, or the like, associated with a user. The user profile 532 may store any number of user privacy indicators 148 associated with any number of application(s) 300. The user profile 532 may also store the user's thresholds, or any other information. In various examples, the user profile data store 524 is encrypted and/or requires authentication before data may be stored within a user profile 532 or data may be retrieved from a user profile 532.

The user profile data store 524 may be optional. For example, the user profile 532 and/or data associated with the user profile 532 may be maintained only on the user's user device 104 in order to maintain privacy and/or security.

The user profile data store 524 may be encrypted. In some implementations, the user profile module 506 may store encrypted user privacy indicators 148 and provide the encrypted user privacy indicators 148 without decrypting. For example, the user profile module 506 may receive a request to store encrypted user privacy indicators 148 associated with a user and/or user device 104. The user profile module 506 may authenticate the request and store the encrypted user privacy indicators 148 in an account or user profile 532 associated with the user and/or the user device 104 in the user profile data store 524. Subsequently, the user profile module 506 may receive a request for the encrypted user privacy indicators 148. The user profile module 506 may authenticate the request and, assuming the request is authenticated, provide the encrypted user privacy indicators 148 to the user or the user device 104. In some examples, the user profile module 506 may be configured to provide the user privacy indicators 148 based on a password, encryption key, MAC address, IP address, and/or the like.

A module may be hardware, software, or a combination of both. In some implementations, a module may instruct a processor to perform methods, steps, and/or functions. In various examples, a processor may execute a module to perform methods, steps, and/or functions. Although the privacy system 110, the privacy indication module 118, the sensitivity determination module 120, and the global sensitivity threshold module 502 includes identified modules, there may be less or more modules associated with any device that do any number of functions. Further, some modules of the digital devices identified herein are optional.

Figure 6:
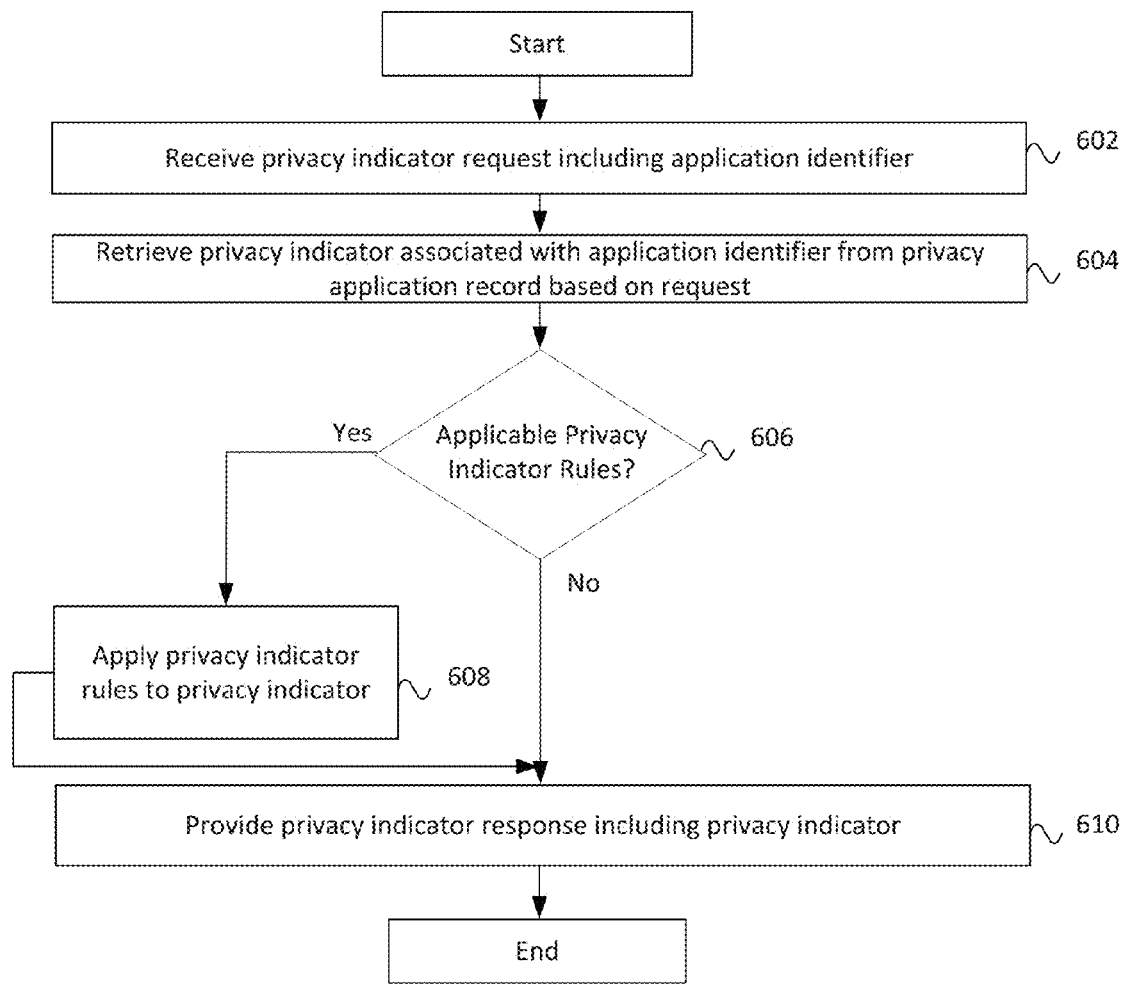
FIG. 6 is a flow diagram illustrating a method for providing privacy indicator associated with an application based on a privacy indicator request in some embodiments.

FIG. 6 is a flow diagram illustrating a method for providing a privacy indicator 148 associated with an application 146 based on a privacy indicator request. In step 602, the global privacy indicator identification module 504 may receive a global privacy indicator request 534 including an application identifier 142. The global privacy indicator request 534 may be from any digital device including, for example, a social network 128d, application store, user device 104, or the like. In various examples, the global privacy indicator identification module 504 decrypts and/or authenticates the global privacy indicator request 534.

In step 604, the global privacy indicator identification module 504 retrieves a global privacy indicator from an application record 302 associated with the application identifier 142 of the request 534. In various implementations, the global privacy indicator identification module 504 retrieves an application record 302 based on the application identifier 142. The application record 302 may be stored in the privacy record data store 122. The privacy record module 522 may retrieve the application record 302 from the privacy record data store 122. The global privacy indicator identification module 504 may retrieve a global privacy indicator from the application identifier 142.

In step 606, the global privacy indicator identification module 504 may determine if there are any applicable privacy indicator rules 526. For example, the global privacy indicator rules module 510 and/or the global privacy indicator identification module 504 may determine if there are any global privacy indicator rules 526 associated with the identified application 146. A global privacy indicator rule 526 may influence or override the global privacy indicator retrieved from the application record 302.

In some examples, if there is an applicable global privacy indicator rule 526 that requires a specific global privacy indicator regardless of the global privacy indicator stored in the application record 302, then the global privacy indicator identification module 504 may provide the global privacy indicator identified by the rule 526. The global privacy indicator rule 526 may be based on conditions. For example, a global privacy indicator rule 526 may require a specific global privacy indicator depending on the digital device (e.g., based on MAC address), user (e.g., based on username or authentication information), country (e.g., based on country associated with the request), and/or any other factors. In step 608, the global privacy indicator rules module 510 and/or the global privacy indicator identification module 504 apply any applicable rules 526 (e.g., based on any rule conditions).

In various implementations, the global privacy indicator rules 526 indicate whether to share or not to share the global privacy indicator. For example, a global privacy indicator rule 526 may indicate it is appropriate to share global privacy indicators with certain requestors (e.g., subscribers) but not others.

In step 610, the global privacy indicator identification module 504 provides the global privacy indicator. In various implementations, the global privacy indicator identification module 504 may provide a global privacy indicator request response including the global privacy indicator. The global privacy indicator provided may be based on the global privacy indicator rules 526, on the global privacy indicator retrieved from the application record 302, or both. In various examples, the global privacy indicator identification module 504 encrypts the global privacy indicator request response.

Figure 7:
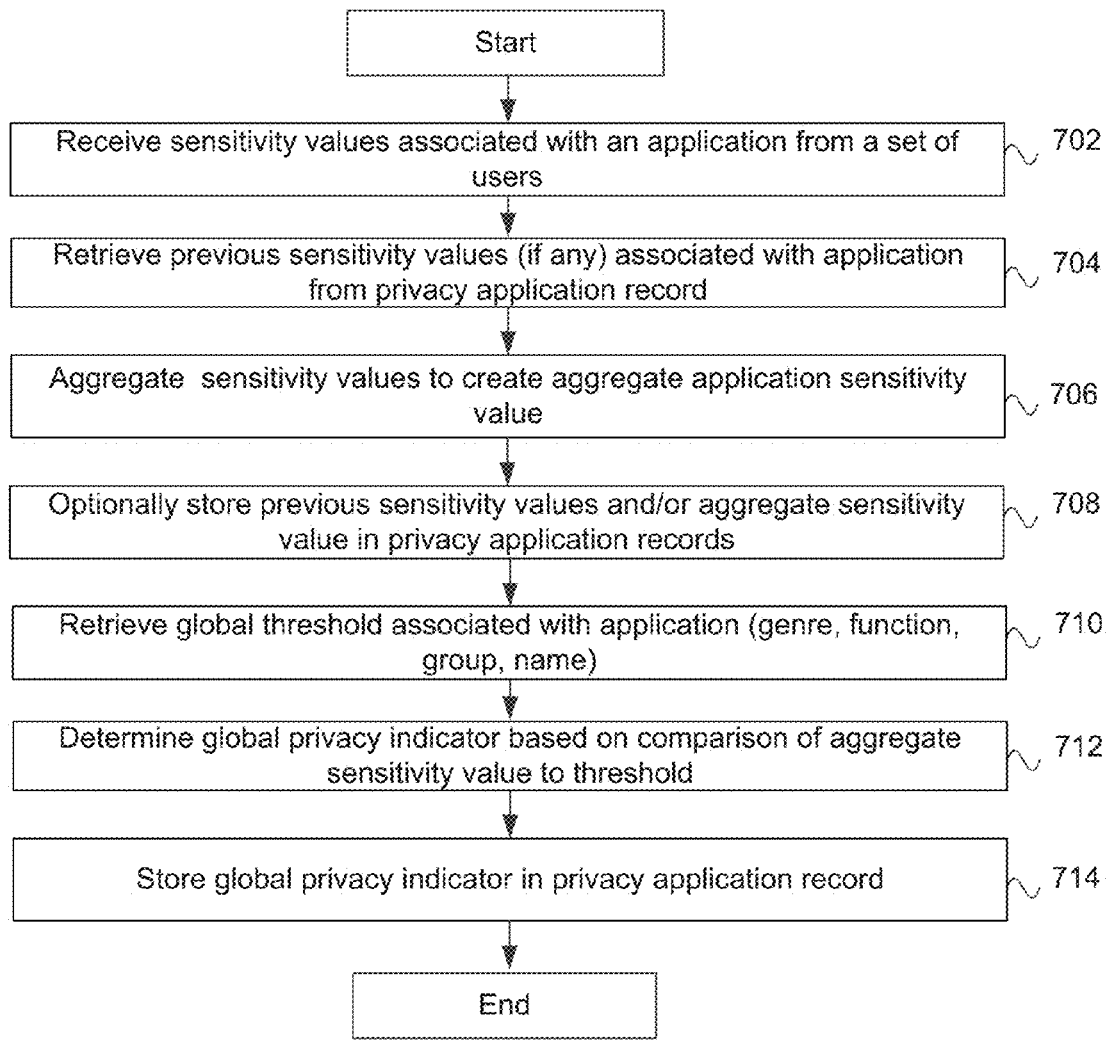
FIG. 7 is a flow diagram illustrating a method for determining a sensitivity value and a privacy indicator based on the sensitivity value in some embodiments.

FIG. 7 is a flow diagram illustrating a method for determining a sensitivity value and a privacy indicator based on the sensitivity value in some embodiments. In step 702, the sensitivity aggregation module 514 receives sensitivity values associated with an application for a set of users. In various embodiments, users may provide user privacy indicators and/or user sensitivity values for any number of applications (e.g., associated with application identifiers) to the privacy system 110. The user privacy indicators and/or user sensitivity values may be stored in the applicable application record (e.g., based on application identifier).

In step 704, the sensitivity aggregation module 514 may retrieve previously received sensitivity values 124 (if any) and currently received sensitivity values 124 (if any) associated with the application. In step 706, the sensitivity aggregation module 514 aggregates, groups, and/or analyzes the sensitivity values 124 associated with an application 146 (e.g., based on the application identifier 142) to create an aggregate sensitivity value for the application 146. In various examples, different sensitivity values 124 may be weighted differently. For example, older sensitivity values 124 may be discounted and/or newer sensitivity values 124 may be weighted heavier. In some implementations, users or digital devices are identified as being particularly reliable sensitivity values 124, while others are identified as being particularly unreliable. As such, the sensitivity aggregation module 514 may assign weights to sensitivity values 124 from these sources accordingly.

In step 708, the sensitivity aggregation module 514 may store the previous sensitivity values 124 (if not previously stored) and/or the aggregate sensitivity value in the applicable privacy application record 302. Moreover, the sensitivity aggregation module 514 may store the application record 302 in the privacy record data store 122.

In step 710, the global sensitivity threshold module 502 may retrieve a global threshold 530 associated with the application 146 (e.g., from the applicable privacy application record 302). If there is not an applicable global threshold 530 associated with the application 146, the global sensitivity threshold module 502 may retrieve a global threshold 530 associated with one or more other similar applications (e.g., based on genre, function, name, software developer, rating, or the like). If there are no global thresholds 530 and no similar applications, the global sensitivity threshold module 502 may apply a default global threshold 530.

In step 712, the global sensitivity threshold module 502 determines the global privacy indicator based on a comparison of the aggregate sensitivity value from the sensitivity aggregation module 514 to the global threshold 530. The global privacy indicator may be a flag (e.g., present or not present), a value indicative of a level of intent for privacy, or the like.

In step 714, the global sensitivity threshold module 502 may store the global privacy indicator in the applicable privacy application record 302. Subsequently, the global privacy indicator identification module 504 may utilize or provide the new global privacy indicator as needed.

Figure 8:
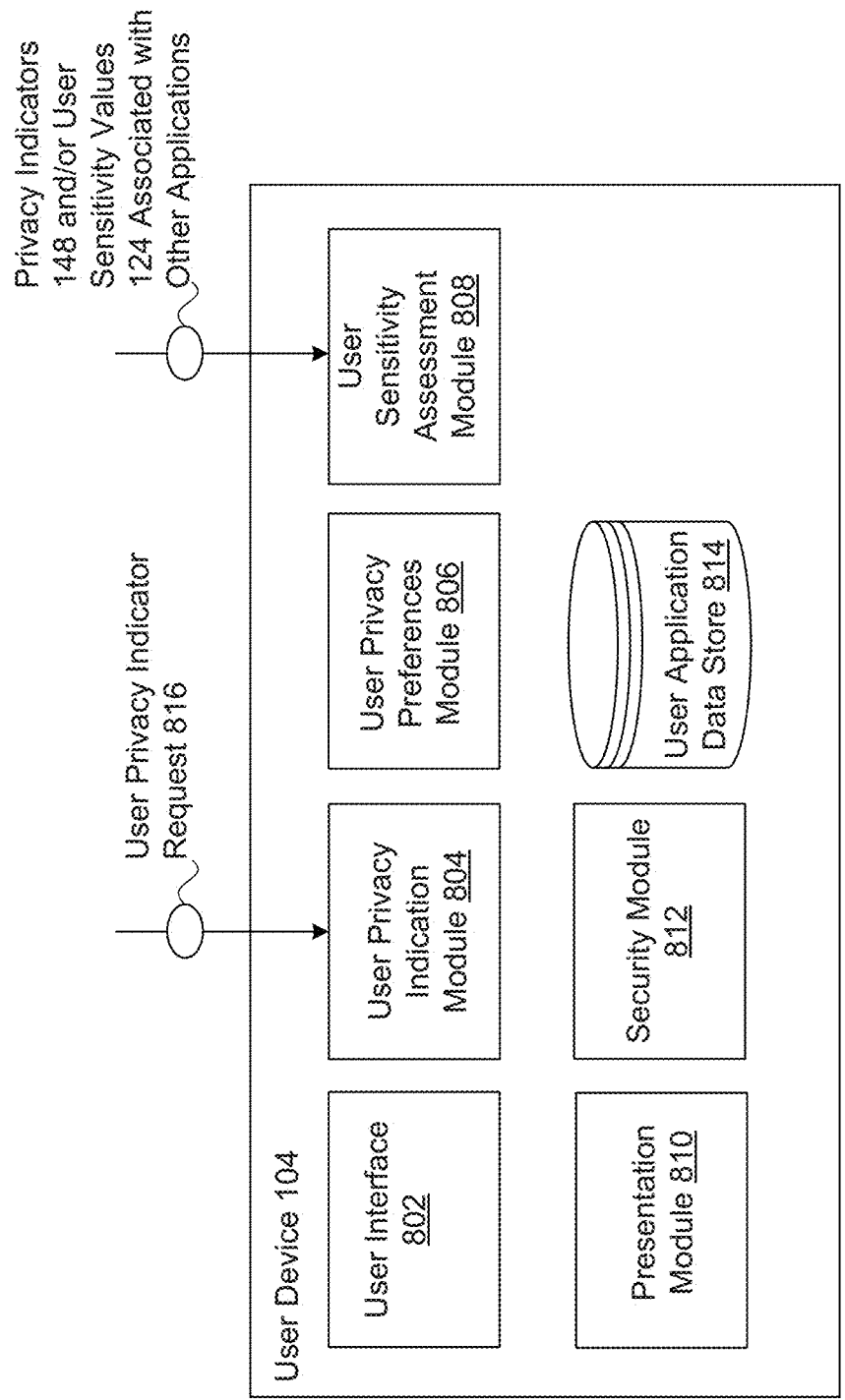
FIG. 8 is a functional block diagram of a user device in some embodiments.

FIG. 8 is a functional block diagram of a user device 104 in some embodiments. The user device 104 may include a user interface 802, a user privacy indication module 804, a user privacy preferences module 806, a user sensitivity assessment module 808, a presentation module 810, a security module 812, and a user application data store 814. The user interface 802 may generate a user interface on the user device 104 to present information (e.g., requests for information, display information, display application icons, or the like) and/or receive information.

The user privacy indication module 804 may be configured to request and provide user privacy indicators 148. In some examples, the user may search for information regarding an application 146 and subsequently receive a list of application identifiers 306. The user privacy indication module 804 may, in some examples, identify the application identifiers 306, retrieve user privacy indicators 148 associated with the application identifiers 306, and display (e.g., on the display 108 of the desktop computing device 104a) the user privacy indicators 148 (e.g., each user privacy indicator (if any) being displayed next to the corresponding application identifier 142 in the user interface 106a).

In some examples, the user privacy indication module 804 may identify one or more applications 146 as the user views applications on the web or in an application store. Websites and/or application stores may display information regarding any number of applications 146 as requested by the user. The websites and/or application stores may request that a user privacy indicator 148 associated with the applications 146 be displayed to the user (e.g., with or without sending personally identifying information to the websites and/or application stores). The request may include application identifiers 142 associated with applications 146 being viewed or searched for by the user. Based on the application identifier 142, the user privacy indication module 804 may retrieve user privacy indicator(s) 148 from the user profile 532 and display the indicator(s) 148 to the user. In some examples, the user privacy indication module 804 may provide the user privacy indicator(s) 148 to any number of the website(s) and/or application store(s) (e.g., if the user grants permission for the information to be shared). If the user privacy indicator(s) 148 are shared with a website and/or application store, the receiving user device 104 may display the user privacy indicator 148 to the user.

In various implementations, the user privacy indication module 804 may request a privacy indicator 148 from the user (e.g., utilizing the user interface 802). The request for a privacy indicator may be shown next to an application identifier 142 (e.g., in search results) or in any other manner (e.g., on a web page, in an application store page, or the like).

The user privacy indication module 804 may receive user privacy indicator(s) 148 (e.g., from the user interface 802) and store the privacy indicator(s) 148 in a user profile 532 of the user application data store 814. The user privacy indication module 804 may display a request to the user for the user privacy indicator 148 in any number of ways, including pull down menus (e.g., to flag whether information regarding an application associated with an application identifier should be considered private), empty fields to receive numbers or words, radio buttons, buttons, or the like.

User privacy indicator(s) may be private (i.e., not shared with any other digital device or only shared with a limited number of digital devices). In some examples, the user privacy indicator(s) 148 and/or any user thresholds or other related information may be maintained on the user device 104 without sharing the information with other devices. In some embodiments, the user device 104 may share the user privacy indicator(s) and/or any other information but only after the information has been anonymized (e.g., stripped of at least some information that may be utilized to identify the user).

The user privacy indication module 804 may provide one or more user privacy indicator(s) 148. In some implementations, the user privacy indication module 804 may receive a user privacy indicator request 816 from another application 146 on the user device 104. In some examples, a user may select and install a particular application 146 on the user device 104. The user privacy indication module 804 may, either before, during, or after search, selection, installation, or usage of the particular application 146, request a user privacy indicator 148 from the user for the particular application 146. The user may provide the user privacy indicator 148 to the user privacy indication module 804, which may then store the user privacy indicator 148. Another digital device or application 146, including or related to an application store or a social network 128*d*, for example, may wish to utilize information associated with the selection, installation, or usage of the particular application 146. The application store or social network 128*d* may request a user privacy indicator 148 associated with the particular application 146. If the user privacy indicator 148 indicates that the user intends privacy or requests that information regarding the application 146 not be shared, the application store or the social network 128*d* may choose not to share information (e.g., choose not to receive the information or provide the information to advertisers) based on the user privacy indicator 148.

As previous discussed, the user privacy indicator 148 may be any indication. In some implementations, the user privacy indicator 148 is a single value or any number of values. For example, one user privacy indicator 148 may indicate that no information regarding an application 146 is to be shared or published. Another user privacy indicator 148 may indicate that limited sharing (e.g., with selected users or a user group) is acceptable. Still another user privacy indication 148 may indicate public sharing is acceptable.

In some implementations, the user privacy indicator 148 may override a global privacy indicator. For example, one particular application 146 may not generally be considered to be private and so the particular application 146 may be associated with a global privacy indicator indicating public sharing is acceptable. However, the user of the particular application 146 may be more sensitive and require limited or no sharing of information related to the application 146. In this example, the user privacy indicator 148 for the particular user may be utilized while other users may utilize the more permissive global privacy indicator (or no global privacy indicator at all for full public sharing). Alternately, if the user expressly or otherwise prefers to share information (e.g., provides a less restrictive privacy indicator 148 as compared to the global privacy indicator), information regarding the application associated with the user may be shared while information of others may not be shared.

The user privacy preferences module 806 is configured to receive user preferences regarding user privacy indicators 148, user sensitivity values 124, and user thresholds 530. The user may set any number of preferences. User privacy indicator preferences may include any settings related to requesting, storing, or providing privacy indicators 148. For example, a user privacy indicator preference may indicate that all user privacy indicators are to indicate the strongest privacy option unless the user expressly overwrites the user privacy indicator 148. In another example, a user privacy indicator preference may indicate that all user privacy indicators 148 are to indicate no privacy option or be the same as an associated global privacy indicator (if any) unless the user expressly overwrites the user privacy indicator 148.

The user may provide settings to automate association of user privacy indicators 148 for different applications 146. For example, the user may provide a setting that all applications 146 associated with one genre or category are to be considered very private (e.g., information related to these applications is not to be shared or published) while other applications 146 associated with a second genre or category are to be considered public (e.g., information related to these applications may be shared or published). User privacy indicator(s) may be established and/or guided by the user settings in any number of ways.

In various implementations, the user may provide settings regarding sharing user privacy indicator(s) 148, user sensitivity value(s) 124, and/or user threshold(s) 530. For example, a user may indicate that the user privacy indicator(s) 148, user sensitivity value(s) 124, and user threshold(s) 530 are not to be shared. In some examples, the user may indicate that the user privacy indicator(s) 148, user sensitivity value(s) 124, and user threshold(s) 530 may be shared (e.g., with a privacy system 110 to assist in the generation of global thresholds 530, aggregate sensitivity values, and/or global privacy indicators), but only if anonymized (e.g., all personally identifying information may be removed from the user privacy indicator(s) 148, user sensitivity value(s) 124, and user threshold(s) 530 prior to sharing). Other users may indicate that the user privacy indicator(s) 148, user sensitivity value(s) 124, and user threshold(s) 530 may be shared without restriction. The user may also establish settings to encrypt information associated with user privacy indicator(s) 148, user sensitivity value(s) 124, or user threshold(s) 530 and/or require authentication before sharing.

The user sensitivity assessment module 808 may determine a user sensitivity value 124 associated with an application 146. A user sensitivity value 124 may be any numeric value indicating a degree (e.g., an intensity) of a user's sensitivity related to sharing or publishing information associated with an application 146 or search. In some examples, a high sensitivity value 124 may indicate that a user requests and/or strongly prefers that information associated with their selection, installation, and usage of an application not be shared or published.

The user sensitivity value may quantify sensitivity in any manner. In some examples, low sensitivity values 124 may indicate high sensitivity while high sensitivity values 124 may indicate low sensitivity. Moreover, sensitivity values 124 may be integers representing a level of sensitivity. Additionally, sensitivity values may range between 1-10 integers, one being the lowest sensitivity and 10 being the highest.

The user sensitivity assessment module 808 may be configured to generate a user privacy indicator 148 and/or a user sensitivity value 124 for an application 146 based on privacy indicators 148 and/or a user sensitivity values 124 associated with other applications 146. As discussed previously, many applications 146 are related to other applications 146. For example, an application 146 may be an updated or different version of another application (e.g., the ANGRY BIRDS STAR WARS II® application is a different version of THE ANGRY BIRDS® application). In another example, many applications 146 may be related by genre (e.g., category) such as adult applications, gambling applications, medical applications, children's applications, social network applications, or the like. Applications 146 may be related to each other in many different ways including, but not limited to, by application developer, title, subject matter, rating, or description. Similar applications may have similar global privacy indicators.

In various implementations, the user sensitivity assessment module 808 receives an application identifier 142. In some examples, the user sensitivity assessment module 808 receives an application identifier 142 from any digital device (e.g., as a part of an application search, viewing an application 146, or a determination of whether to share information associated with the identified application 146). The user sensitivity assessment module 808 may determine a privacy indicator 148 or a user sensitivity value 124 based on applications 146 that are similar to the identified application 146.

The user sensitivity assessment module 808 may identify similar applications in any number of ways. In some implementations, the user sensitivity assessment module 808 may determine if the user has any rules (e.g., from the user privacy preferences module 806) defining similar applications for the purposes of assigning user privacy indicator(s) 148. For example, the user may generate a rule that indicates that all game applications in general or all applications related to the ANGRY BIRDS® game or the ANGRY BIRDS® franchise are similar applications and/or may receive similar global privacy indicators as each other.

In additional examples, different applications 146 may be related by category or subject matter. Categories may be defined, for example, by the user, an administrator, one or more users, or an operator of an application store (e.g., GOOGLE PLAY® or APPLE ITUNES®). The subject matter of an application 146 may be defined by the application developer, title of the application, description of an application, administrator, and/or operator of an application store.

After the user sensitivity assessment module 808 identifies similar applications to the application 146 identified by the application identifier 142, the user sensitivity assessment module 808 may retrieve user privacy indicators 148 for all or some of the similar applications from the user privacy indication module 804. The user sensitivity assessment module 808 may generate a user privacy indicator 148 based on the retrieved user privacy indicators 148 (e.g., by averaging or otherwise aggregating the global privacy indicators).

The user sensitivity assessment module 808 may assign different weights to different user privacy indicators 148 based on a degree of similarity between applications 146. For example, the user sensitivity assessment module 808 may assign high weight to privacy indicators of a very similar application (e.g., same subject matter, category, and developer) while applying a lower weight for applications that are not as similar (e.g., an application that may share similar subject matter but be in a different category). The user sensitivity assessment module 808 may assess weighted and/or unweighted privacy indicators 148 to generate the new user privacy indicator 148.

In some implementations, the user sensitivity assessment module 808 may receive user sensitivity values 124 for all or some of the similar applications (e.g., from the application records 302 and/or users). The user sensitivity assessment module 808 may generate a sensitivity value based on the received user sensitivity values 124 (e.g., by averaging or otherwise aggregating the user sensitivity values 124).

As similarly discussed regarding privacy indicators 148, the user sensitivity assessment module 808 may assign different weights to different user sensitivity values 124 based on a degree of similarity between applications 146. For example, the user sensitivity assessment module 808 may assign a high weight to a user sensitivity value 124 of a very similar application (e.g., same subject matter, category, and developer) while applying a lower weight for applications that are not as similar (e.g., an application that may sharing similar subject matter but being in a different category). The user sensitivity assessment module 808 may assess weighted and/or unweighted user sensitivity values to generate the aggregate user sensitivity value.

The user sensitivity assessment module 808 may generate and/or initiate a process to generate a user privacy indicator 148 and/or an aggregate user sensitivity value of an application 146 at any time. In some examples, the user sensitivity assessment module 808 generates and/or initiates a process to generate the user privacy indicator 148 and/or the aggregate user sensitivity value periodically (e.g., at predetermined or certain times, at predetermined or threshold time intervals, or at a duration of time since the last global privacy indicator and/or the aggregate sensitivity value was determined). In additional examples, the user sensitivity assessment module 808 generates and/or initiates a process to generate the user privacy indicator 148 and/or the aggregate user sensitivity value after receiving a number of user privacy indicators 148 and/or user sensitivity values for any number of applications.

The user sensitivity assessment module 808 may or may not generate a user privacy indicator 148 or aggregate user sensitivity value for an application 146 if that same application 146 is already associated with a user privacy indicator 148. In some implementations, the user sensitivity assessment module 808 generates a privacy indicator 148 or aggregate sensitivity value for applications 146 without user privacy indicators 148. In some examples, the user sensitivity assessment module 808 generates a user privacy indicator 148 or aggregate user sensitivity value for applications 146 with user privacy indicators 148. If the user privacy indicator 148 or the aggregate user sensitivity value for an application 146 indicates a change in the previously existing user privacy indicator 148, the user sensitivity assessment module 808 may update the user privacy indicator 148 accordingly and/or notify the user of the change.

In various implementations, user sensitivity values 124 and/or aggregate user sensitivity values may be compared to one or more user sensitivity thresholds 530 to determine one or more user privacy indicator(s) 148. For example, a high sensitivity may be compared to a user sensitivity threshold 530 to generate a user privacy indicator 148 indicating the highest request for privacy for information related to the associated application 146. User sensitivity thresholds 530 may be generated by the user (e.g., via the user privacy preferences module 806). In various examples, the user privacy preferences module 806 may retrieve any number of thresholds 530 from the privacy system 110. Similarly, the user privacy indicator 148 generated by the user sensitivity assessment module 808 may be compared to user privacy thresholds 530 to confirm or change the user privacy indicator 148 from the sensitivity assessment module 808.

The user sensitivity threshold 530 and/or the user privacy threshold 5 may indicate a value or a range. For example, any user sensitivity value 124 over a top threshold may indicate a strong intent that information regarding an application be maintained as private (e.g., information regarding the application should not be published or shared). A user sensitivity value 124 between a middle threshold and a top threshold may indicate a desire that information regarding an application be maintained as private but potentially sharing information with a limited number of others such as close friends. A user sensitivity value 124 between the middle threshold and a low threshold may indicate a desire that the information regarding the application 146 not be shared with the public, while a user sensitivity value below a low threshold may indicate that information associated with the application 146 is not to be considered private.

In various implementations, the user sensitivity assessment module 808 may identify demographics, preferences, and/or other information regarding the user of the user device 104. The user sensitivity assessment module 808 may request user privacy indicator(s) 148 and/or global privacy indicator(s) of other users that are associated with the demographics, preferences, and/or other information of the user of the user device 104. In some examples, the user sensitivity assessment module 808 may provide some user identifying information to the privacy system 110 to request user privacy indicator(s) 148, global privacy indicator(s), and/or sensitivity value(s) 124 related to similar users for any number or type of applications 146 in order to assess and/or determine user privacy indicator(s) 148 that is likely to be accurate for the user of the user device 104. The user sensitivity assessment module 808 may determine user privacy indicator(s) 148 in any number of ways.

The presentation module 810 is configured to present or share information associated with an application 146 based on the user privacy indicator 148 or the global privacy indicator. In various implementations, the user may select and install an application 146 on the user device 104. The presentation module 810 may detect installation of the application 146 and request a user privacy indicator 148 (e.g., from the user privacy indication module 804) associated with the application 146. The presentation module 810 may request a global privacy indicator if no user privacy indicator 148 is available. The presentation module 810 may determine if information associated with the application 146 is intended to be private (e.g., based on the user privacy indicator 148 and/or global privacy indicator).

In various implementations, based on the user privacy indicator 148 or global privacy indicator, the presentation module 810 may direct an operating system to ensure that the application 146 appears only when the user is logged into the user device 104 and/or the user is active. The presentation module 810 may control installation such that applications 146 that are private (e.g., associated with a particular privacy indicator 148 at or above and/or below a given threshold) are installed in a common secured folder or in any position on a screen. In some examples, the presentation module 810 may make applications 146 not visible to any number of users based on the user privacy indicator 148 and/or global privacy indicator.

The presentation module 810 may receive requests to share information regarding an application 146 (e.g., from another application or another digital device). The presentation module 810 may allow sharing, limited sharing, or deny sharing based on the user privacy indicator 148 and/or global privacy indicator. Based on the user privacy indicator and/or user sensitivity value, the presentation module 810 may remove or intercept data tracking of information related to an application (e.g., usage or installation of an application, not including information related to the application in a log or user history, or the like). In some implementations, the presentation module 810 is included in the user device 104, the privacy indication module 118, or both.

The security module 812 may limit or prevent access to the user profile 532, user preferences, user privacy indicator(s) 148, user sensitivity value(s) 124, user thresholds 530, or the like. In various implementations, the security module 812 may require authentication and/or encryption keys before allowing access. The presentation module 810 may locate installed applications of a given privacy level (e.g., based on the user privacy indicators 148 of the applications 146) together in a folder or directory. The security module 812 may secure (e.g., encrypt) or otherwise limit access to the folder or directory. The security module 812 may be controlled by user settings in the user privacy preferences module 806.

The user application data store 814 may include one or more databases, indices (e.g., inverted indices), files, or other data structures that may be used to implement the techniques of the present disclosure. The user application data store 814 may store the user profile 532, user preferences, user privacy indicator(s) 148, user sensitivity value(s) 124, user thresholds 530, or the like. All or parts of the user application data store 814 may be encrypted.

The user privacy preferences module 806 may include a setting that indicates that no data regarding the user profile, user privacy indicator, or user sensitivity values leave the user device 104. Although the user device 104 includes identified modules, there may be less or more modules associated with any user device 104 that do any number of functions. Further, some modules of the digital devices identified herein may be optional.

Figure 9:
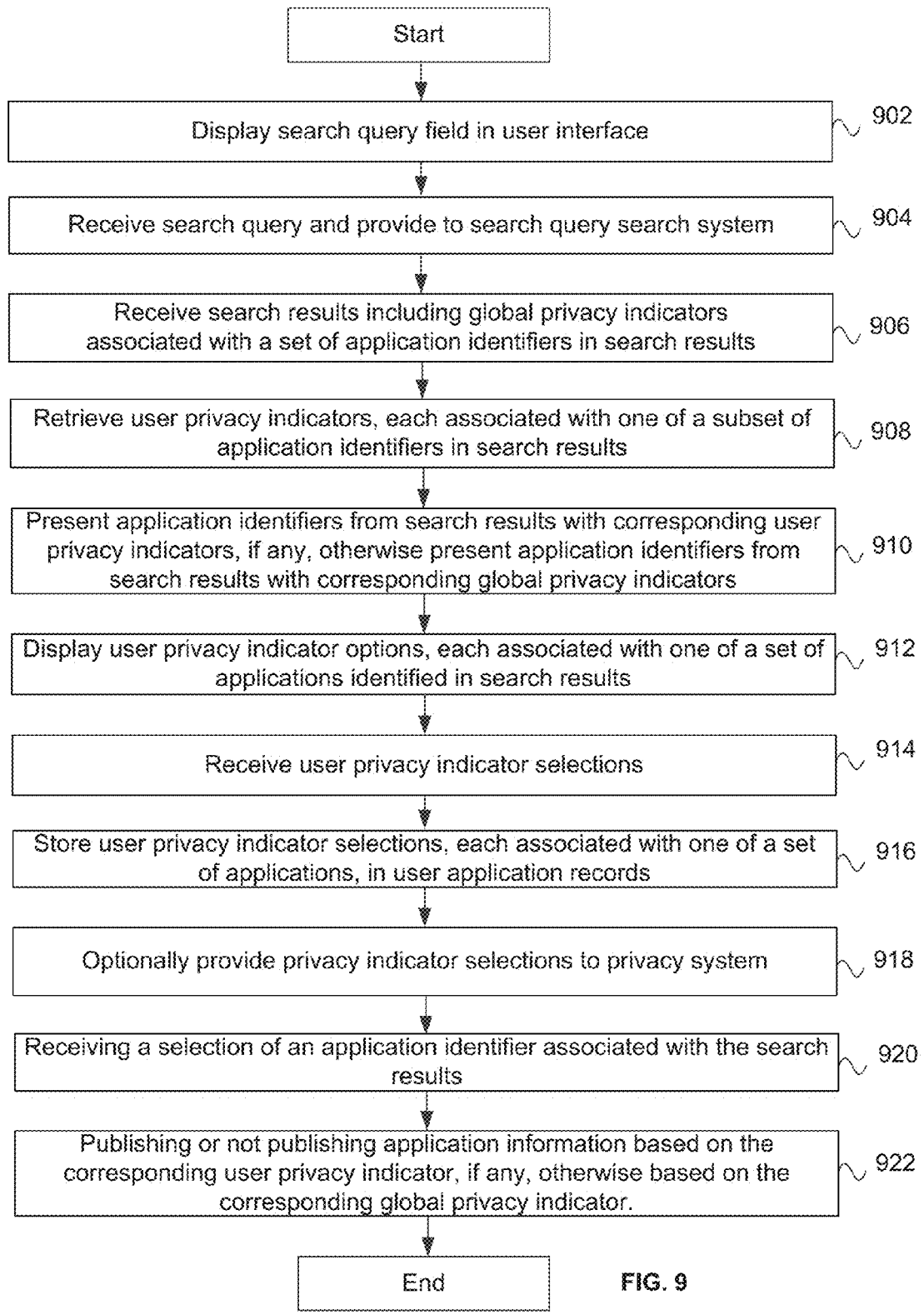
FIG. 9 is a flow diagram illustrating a method for display of privacy indicators corresponding with application identifiers in search results and publishing application information associated with a selected application identifier based on the corresponding privacy indicator in some embodiments.

FIG. 9 is a flow diagram illustrating a method for display of privacy indicators corresponding with application identifiers in search results and publishing application information associated with a selected application identifier based on the corresponding privacy indicator in some embodiments. In step 902, the user interface 802 of the user device 104 displays a search query field to a user. In step 904, the user interface 802 receives a search query 208 and may provide the search query 208 to a search query search system, such as the search system 102. In step 906, the user privacy indication module 804 may receive search results 210 including global privacy indicators associated with a set of application identifiers 306 (e.g., application identifiers 142) in the search results 210.

In step 910, the user privacy indication module 804 may retrieve user privacy indicators 148. Each of the user privacy indicators 148 are associated with at least one of a subset of application identifiers 306 in the search results 210. The user privacy indication module 804 may retrieve privacy indicators 148 from a user profile 532 stored in the user application data store 814. The user privacy indication module 804 may retrieve privacy indicators 148 stored on any digital device including, for example, from the privacy system 110.

There may be any number of user privacy indicators 148 associated with the application identifiers 306. For example, there may be a given number of user privacy indicators 148 associated with five different application identifiers 306 contained in the search results 210. There may be some application identifiers 306 contained in the search results 210 that are not associated with a user privacy indicator 148.

In step 910, the user interface 802 presents application identifiers 306 from search results 210 with corresponding user privacy indicators 148, if any. The user interface 802 may present application identifiers 306 from search results 210 with corresponding global privacy indicators, if any. In some examples, the user interface 802 displays both the user privacy indicator 148 and global privacy indicator associated with an application identifier 142, if both are available. In additional examples, the user interface 802 displays only the user privacy indicator 148 if a user privacy indicator 148 for the application identifier 142 is available and only the global privacy indicator if the user privacy indicator 148 for the application identifier is not available.

In step 912, the user interface 802 displays user privacy indicator options. Each of the user privacy indicator options is associated with one of a set of applications 146 identified in the search results 210. A user privacy indicator option may include a request for the user of the user device 104 to identify a user privacy indicator 148 and/or a user sensitivity value 124. The user privacy indicator option may include a pull down menu of options, radio buttons, a field, or any other functionality. In some examples, the user interface 802 displays user privacy indicator options when no user privacy indicator 148 and/or global privacy indicator is available. In additional examples, the user interface 802 displays user privacy indicator options for each of the application identifiers 306 of the search results 210.

In step 914, the user interface 802 receives user privacy indicator selections utilizing the user privacy indicator options. In step 916, the user privacy indication module 804 may store user privacy indicator(s) 148 based on the user privacy indicator selection(s). The user privacy indication module 804 may store the user privacy indicator(s) 148 in a user profile 532 on the user device 104 or any other digital device. In some embodiments, the user sensitivity assessment module may store user sensitivity value(s) 306 (e.g., in the user profile 532).

Optionally, in step 918, the user privacy indication module 804 may store the user privacy indicator(s) 148 in a user profile 532 on the privacy system 110. In some examples, the user privacy indication module 804 may anonymize or otherwise remove personally identifiable information from the user privacy indicator(s) 148 before providing the information to the privacy system 110. The user privacy indication module 804 may encrypt the user privacy indicator(s) before providing the information to the privacy system 110.

In step 920, the user interface 802 may receive a selection of one of the application identifiers 306 of the search results 210 from the user. In step 922, the presentation module 810 may determine whether to publish (e.g., display or share) information associated with the selected application 146 (e.g., search, display, selection, installation, or usage of the selected application) based on the selected application's corresponding user privacy indicator 148, if any. If there is no user privacy indicator 148 associated with the selected application 146, the presentation module 810 may determine whether to publish or not publish information regarding the selected application 146 based on the corresponding global privacy indicator. If there is neither a user privacy indicator 148 nor a global privacy indicator associated with the selected application 146, the presentation module 810 may rely on any instructions in the user settings and/or determine whether to permit or publish information associated with the selected application 146.

Figure 10:
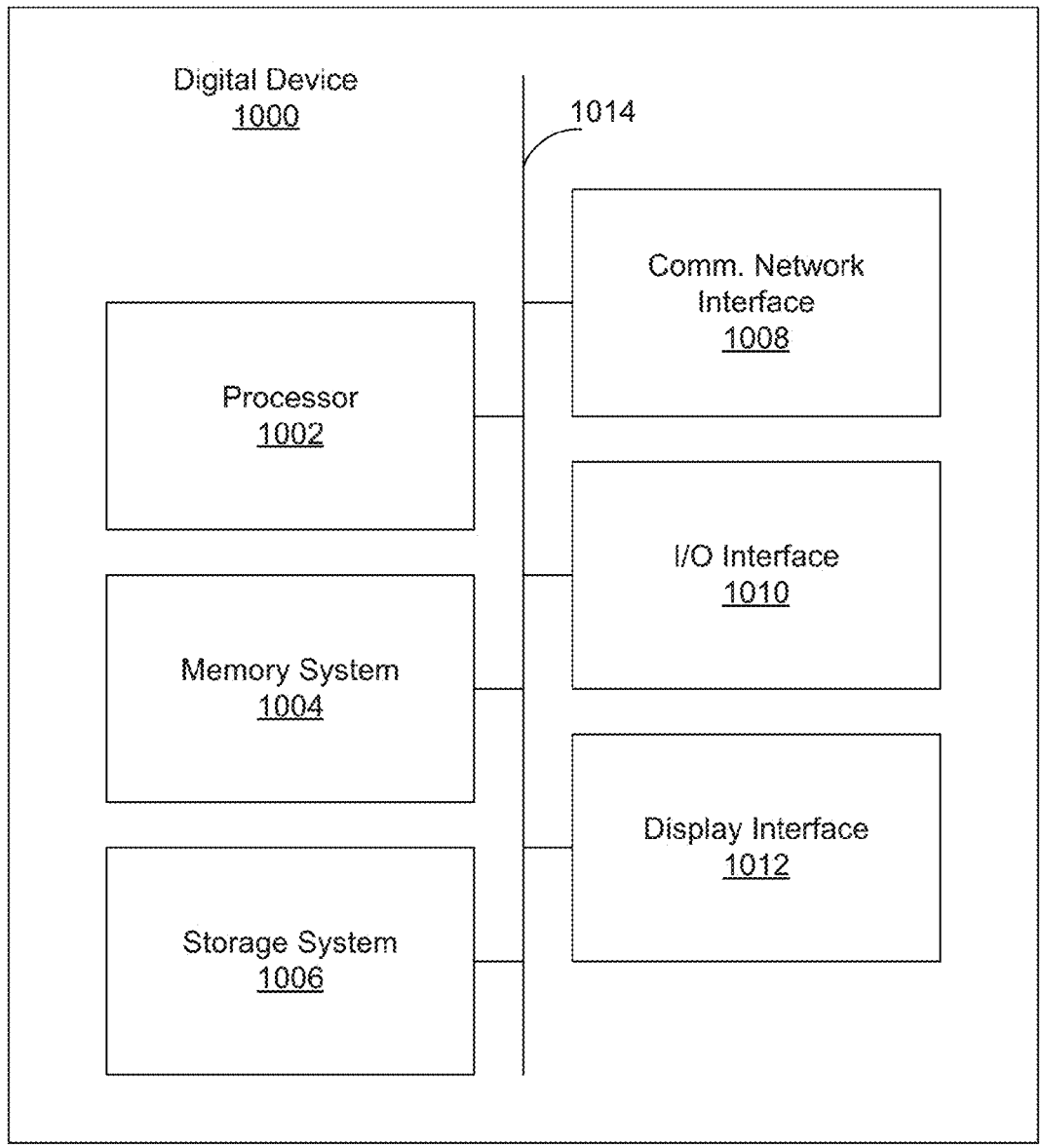
FIG. 10 is a functional block diagram of a digital device in some embodiments.

FIG. 10 is a functional block diagram of a digital device 1000. The digital device 1000 includes a processor 1002 (e.g., a data processing device), a memory system 1004 (e.g., non-transitory memory), a storage system 1006, a communication network interface 1008, an I/O interface 1010, and a display interface 1012 communicatively coupled to a bus 1014. The processor 1002 is in communication with the memory system 1004, the storage system 1006, the communication network interface 1008, the I/O interface 1010, and the display interface 1012. The processor 1002 is also configured to execute executable instructions (e.g., programs stored on the memory system 1004 or the storage system 1006). In some examples, the processor 1002 includes circuitry or any processor capable of processing the executable instructions.

The memory system 1004 is any non-transitory memory configured to store data. Some examples of the memory system 1004 are storage devices, such as RAM or ROM. The memory system 1004 can comprise the ram cache. The data within the memory system 1004 may be cleared or ultimately transferred to the storage system 1006.

The storage system 1006 is any storage configured to retrieve and store data. Some examples of the storage system 1006 are flash drives, hard drives, optical drives, and/or magnetic tape. The storage system 1006 may comprise non-transitory media. In some implementations, the digital device 1000 includes a memory system 1004 in the form of RAM and a storage system 1006 in the form of flash data. Both the memory system 1004 and the storage system 1006 include computer readable media that may store instructions or programs that are executable by a computer processor including the processor 1002.

The communication network interface (com. network interface) 1008 can be coupled to a network (e.g., network 112) via the link 1016. The communication network interface 1008 may support communication over an Ethernet connection, a serial connection, a parallel connection, or an ATA connection, for example. The communication network interface 1008 may also support wireless communication (e.g., 802.11 a/b/g/n, WiMax). Moreover, the communication network interface 1008 can support many wired and wireless standards.

The optional input/output (I/O) interface 1010 is any device that receives input from the user and outputs data. The optional display interface 1012 is any device that is configured to output graphics and data to a display. In some examples, the display interface 1012 is a graphics adapter. While not all digital devices include either the I/O interface 1010 or the display interface 1012, the digital device 1000 may include either, both, or none.

The hardware elements of the digital device 1000 are not limited to those depicted in FIG. 10. A digital device 1000 may comprise more or less hardware elements than those depicted. Further, hardware elements may share functionality and still be within various implementations described herein.

In some examples, encoding and/or decoding may be performed by the processor 1002 and/or a co-processor located on a GPU (i.e., Nvidia).

The above-described functions and components can be comprised of instructions that are stored on a storage medium such as a computer readable medium (e.g., a non-transitory computer readable medium). The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present disclosure. Those skilled in the art are familiar with instructions, processor(s), and storage medium.

The present disclosure is described above with reference to exemplary embodiments. It will be apparent to those skilled in the art that various modifications may be made and other embodiments can be used without departing from the broader scope of the present disclosure. Therefore, these and other variations upon the exemplary embodiments are intended to be covered by the present disclosure.

The invention claimed is:

1. A method comprising:
    storing, by a data processing device of a user device, a plurality of applications in non-transitory memory of the user device;
    determining, by the data processing device, a plurality of privacy indicators associated with the plurality of applications, each application having a global privacy indicator associated therewith indicating a default degree of privacy to be applied to the application that is based on collective privacy settings of previous users of the application, and at least one of the plurality of applications having a respective user privacy indicator associated therewith that indicates a user defined degree of privacy to be applied to the application, the user defined degree of privacy being provided by a user of the user device;
    storing the plurality of privacy indicators in the non-transitory memory in communication with the data processing device;
    receiving, by the data processing device, a request to publish information regarding a particular application of the plurality of applications;
    determining, by the data processing device, whether the particular application has a user privacy indicator associated therewith;
    when the particular application has an associated user privacy indicator, controlling publication of the information regarding the particular application in accordance with the user privacy indicator; and
    when the particular application does not have an associated user privacy indicator, controlling publication of the information regarding the particular application in accordance with the global privacy indicator associated with the particular application.

2. The method of claim 1, wherein the request to publish information regarding the particular information is a request to publish download information indicating a download of the particular application in another application.

3. The method of claim 1, further comprising selectively displaying on a display in communication with the data processing device the information regarding the particular application based on either the user privacy indicator associated with the particular application or the global privacy indicator associated with the particular application.

4. The method of claim 3, wherein the information comprises history information indicating a previous download of the at least one of the plurality of applications.

5. The method of claim 1, wherein each of the plurality of privacy indicators indicates whether the information related to the associated application is intended to be private.

6. The method of claim 1, wherein each of the plurality of privacy indicators is a value corresponding to a degree that information related to the associated application is intended to be private.

7. The method of claim 1, wherein a global privacy indicator associated with an application is based on input received from a plurality of users of the application on different user devices.

8. The method of claim 1, further comprising:
    receiving, at the data processing device, a function category associated with at least one function of at least one application and further associated with a category privacy indicator; and
    determining at least one of the plurality of privacy indicators based on the category privacy indicator.

9. The method of claim 1, wherein the plurality of privacy indicators are private.

10. A non-transitory computer readable medium comprising executable instructions, the instructions being executable by a data processing device to perform a method, the method comprising:
    storing a plurality of applications in non-transitory memory of the data processing device;
    determining a plurality of privacy indicators associated with the plurality of applications, each application having a global privacy indicator associated therewith indicating a default degree of privacy to be applied to the application that is based on collective privacy settings of previous users of the application, and at least one of the plurality of applications having a respective user privacy indicator associated therewith that indicates a user defined degree of privacy to be applied to the application, the user defined degree of privacy being provided by a user of the data processing device;
    storing the plurality of privacy indicators in the non-transitory memory in communication with the data processing device;
    receiving a request to publish information regarding a particular application of the plurality of applications;
    determining whether the particular application has a user privacy indicator associated therewith;
    when the particular application has an associated user privacy indicator, controlling publication of the information regarding the particular application in accordance with the user privacy indicator; and
    when the particular application does not have an associated user privacy indicator, controlling publication of the information regarding the particular application in accordance with the global privacy indicator associated with the particular application.

11. A user device comprising:
    non-transitory memory storing:
        a plurality of applications; and
        a plurality of privacy indicators associated with the plurality of applications, each application having a global privacy indicator associated therewith indicating a default degree of privacy to be applied to the application that is based on collective privacy settings of previous users of the application, and at least one of the plurality of applications having a respective user privacy indicator associated therewith that indicates a user defined degree of privacy to be applied to the application, the user defined degree of privacy being provided by a user of the user device; and a data processing device in communication with the non-transitory memory and executing instructions that cause the data processing device to:

receive a request to publish information regarding a particular application of the plurality of applications;

determine whether the particular application has a user privacy indicator associated therewith;

when the particular application has an associated user privacy indicator, control publication of the information regarding the particular application in accordance with the user privacy indicator; and when the particular application does not have an associated user privacy indicator, control publication of the information regarding the particular application in accordance with the global privacy indicator associated with the particular application.

12. The method of claim 1, wherein the request to publish information regarding the particular information is a request to display an icon of the particular application in a graphical user interface of the user device.

* * * * *